(12) United States Patent
Ukai et al.

(10) Patent No.: US 8,071,036 B2
(45) Date of Patent: Dec. 6, 2011

(54) MERCURY REDUCTION SYSTEM

(75) Inventors: Nobuyuki Ukai, Hiroshima (JP);
Moritoshi Murakami, Hiroshima (JP);
Susumu Okino, Hiroshima (JP); Tatsuto Nagayasu, Hiroshima (JP); Seiji Kagawa, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/640,599

(22) Filed: Dec. 17, 2009

(65) Prior Publication Data
US 2011/0002827 A1    Jan. 6, 2011

Related U.S. Application Data

(60) Provisional application No. 61/223,177, filed on Jul. 6, 2009.

(51) Int. Cl.
*B01D 53/64* (2006.01)
(52) U.S. Cl. .................. 422/168; 422/111; 422/169
(58) Field of Classification Search .................. 422/168, 422/172, 111, 169, 170
See application file for complete search history.

(56) References Cited

U.S. PATENT DOCUMENTS

| | | |
|---|---|---|
| 6,638,485 B1 | 10/2003 | Iida et al. |
| 7,544,338 B2 | 6/2009 | Honjo et al. |
| 7,670,569 B2 * | 3/2010 | Higgins et al. ............... 422/172 |
| 2007/0202020 A1 | 8/2007 | Honjo et al. |

FOREIGN PATENT DOCUMENTS

| | | |
|---|---|---|
| JP | 61-255993 A | 11/1986 |
| JP | 62-44052 A | 3/1987 |
| JP | 2001-198434 A | 7/2001 |
| JP | 2007-167743 A | 7/2007 |
| JP | 2008-221087 A | 9/2008 |

* cited by examiner

*Primary Examiner* — Jill Warden
*Assistant Examiner* — Joye L Woodard
(74) *Attorney, Agent, or Firm* — Westerman, Hattori, Daniels & Adrian, LLP

(57) ABSTRACT

A mercury reduction system includes an $NH_4Cl$ supplying unit that sprays an $NH_4Cl$ solution into a flue of the boiler, a reduction denitration apparatus that includes a denitration catalyst for reducing NOx in the flue gas with $NH_3$ and oxidizing Hg in the presence of HCl, and a wet desulfurization apparatus for reducing Hg oxidized in the reduction denitration apparatus with limestone-gypsum slurry. The $NH_4Cl$ supplying unit includes an $NH_4Cl$ solution feed pipe that supplies the $NH_4Cl$ solution into the flue in a liquid state, a blow pipe that is inserted into the flue so as to surround the $NH_4Cl$ solution feed pipe and through which air is injected into the flue, and a two-fluid nozzle that is fitted to an end of the $NH_4Cl$ solution feed pipe and through which the $NH_4Cl$ solution is injected. Through the two-fluid nozzle, the $NH_4Cl$ solution is injected and sprayed in fine liquid droplets. $NH_3$ is supplied by an ammonia supplying unit and HCl is supplied by a hydrogen chloride supplying unit wherein both units are located between the $NH_4Cl$ agent supplying unit and the reduction denitration apparatus.

8 Claims, 13 Drawing Sheets

MERCURY REDUCTION SYSTEM

CROSS-REFERENCE TO RELATED APPLICATIONS

This patent document claims the benefit of priority to U.S. Provisional Patent Application Ser. No. 61/223,177, filed on Jul. 6, 2009, which is herein incorporated by reference.

BACKGROUND OF THE INVENTION

1. Field of the Invention

The present invention relates to a mercury reduction system and a mercury reduction method of flue gas containing mercury that reduce mercury in flue gas discharged from a boiler and the like.

2. Description of the Related Art

Coal combustion flue gas and flue gas generated by burning heavy fuel oil may contain dust, sulfur oxide (SOx), and nitrogen oxide (NOx), as well as metallic mercury)($Hg^0$). In recent years, various proposals have been made on methods and apparatuses for treating the metallic mercury, by combining a denitration apparatus that reduces NOx and a wet desulfurization apparatus that uses an alkali absorbent as an SOx absorbent.

As a method for treating metallic mercury in flue gas, a system in which NOx in a flue is removed by spraying ammonia ($NH_3$) in the upstream process of a high-temperature denitration apparatus, and mercury is oxidized (chlorinated) on a denitration catalyst by spraying a chlorinating agent such as hydrochloric acid (HCl), turned into an aqueous mercury chloride solution, and removed by a wet desulfurization apparatus installed downstream has been proposed (for example, see Patent Document 1).

FIG. 11 is a schematic of an air pollution control system including a mercury reduction system. As shown in FIG. 11, in this air pollution control system 100 including a mercury reduction system, flue gas 102 including nitrogen oxide and mercury discharged from a boiler 101 is supplied to a reduction denitration apparatus 103, where nitrogen oxide is reduced. The heat of the flue gas 102 is exchanged with air by an air heater 104, and the flue gas 102 is supplied to a dust collector 106, after the heat is collected by a heat collector 105. A desulfurization apparatus 107 reduces sulfur oxide in the flue gas 102, and discharges the flue gas 102 as purified gas 108. The gas is then heated by a reheater 109 and discharged from a stack 110.

An $NH_3$ injection spot 111 is provided upstream of the reduction denitration apparatus 103, and nitrogen oxide is reduced by $NH_3$ supplied from an $NH_3$ tank 112.

A hydrochloric acid measuring unit 113 installed upstream of the desulfurization apparatus 107 in the flue measures the concentration of hydrochloric acid (HCl) used as a mercury chlorinating agent, and a mercury concentration measuring unit 114 installed downstream of the desulfurization apparatus 107 measures the concentration of mercury (Hg). An arithmetic unit 117 calculates an initial concentration of aqueous hydrogen chloride (HCl) solution 116 supplied from a hydrochloric acid solution tank 115, based on the measured concentration values of hydrochloric acid and mercury (Hg). A controlling unit 118 controls the supply of evaporated hydrochloric acid (evaporated HCl) supplied into the flue from the hydrochloric acid solution tank 115 through an HCl injection spot 119.

As a method of spraying HCl from the HCl injection spot 119, a method of reducing mercury combined with a hydrogen chloride (HCl) vaporizer has been proposed (for example, refer to Patent Document 2).

FIG. 12 is a schematic of a mercury chlorinating agent feed apparatus including an HCl vaporizer. As shown in FIG. 12, in a mercury chlorinating agent feed apparatus 120, the aqueous HCl solution 115 at room temperature stored in the hydrochloric acid solution tank 115 is supplied to the side of an HCl vaporizer 122 with a solution feed pump 121, and turned into mixed gas 123 of HCl and water vapor. The mercury chlorinating agent feed apparatus 120 then supplies the mixed gas 123 into a pipe 127 where heated air 126 for dilution supplied from a diluting unit 125 is circulating, through a gas-liquid separator 124, and adjusts to mixed gas 128 of hydrogen chloride/water/air of a predetermined concentration. The temperature of the mixed gas 128 of hydrogen chloride/water/air is normally 70° C. to 80° C. The obtained mixed gas 128 of hydrogen chloride/water/air is dispersed into a flue 139 from the hydrochloric acid injection spot 119, with a disperser 130 having the same configuration as that used for spraying $NH_3$. Accordingly, the mixed gas 128 is uniformly sprayed into the flue gas 102 containing mercury.

As a method of supplying HCl, a method of reducing mercury combined with an apparatus for sublimating ammonium chloride ($NH_4Cl$) solid has been similarly proposed (for example, refer to Patent Document 3).

FIG. 13 is a schematic of an air pollution control apparatus using an $NH_4Cl$ solid. As shown in FIG. 13, in an air pollution control apparatus 140, ammonium chloride ($NH_4Cl$) stored in a silo 145 is fed to a crusher 147 by a feeder 146, and added to an economizer bypass unit 144a in powdery form. The economizer bypass unit 144a is placed upstream of a denitration apparatus 141 having an ammonia denitration catalyst, and at an inlet region of an economizer 144 provided in a flue 143 of a boiler facility through which flue gas 142 passes though. $NH_4Cl$ is sublimated, due to high ambient temperature of the flue gas 142 of high-temperature (550 to 650° C.) that passes through the economizer bypass unit 144a, and hydrogen chloride (HCl) and ammonia ($NH_3$) are evaporated, and supplied into the flue 143. HCl and $NH_3$ supplied to the flue gas 142 are mixed in the economizer 144.

Patent Document 1: Japanese Patent Publication Laid-open No. H10-230137
Patent Document 2: Japanese Patent Publication Laid-open No. 2007-167743
Patent Document 3: Japanese Patent Publication Laid-open No. 2008-221087

However, in the air pollution control system 100 including a mercury reduction system shown in FIG. 11, and in the mercury chlorinating agent feed apparatus of the mercury reduction system shown in FIG. 12, HCl is a dangerous substance. Accordingly, there poses a problem that extra effort and costs are required to transport and handle HCl.

As the mercury chlorinating agent feed apparatus of the mercury reduction system shown in FIG. 12, if the HCl vaporizer 122 is used, steam 131 and the like is required as a heat source. Accordingly, there poses a problem that installation cost and maintenance cost of the HCl vaporizer 122 and the like are required.

As the air pollution control apparatus shown in FIG. 13, if $NH_4Cl$ is used, the size of particles needs to be fine and well dispersed. Accordingly, there poses a problem that the handling of $NH_4Cl$ is difficult, and the spraying amount of $NH_4Cl$ is not easy to control.

The present invention is made in view of the foregoing, and has an object to provide a mercury reduction system and a mercury reduction method of flue gas containing mercury with enhanced mercury reduction performance and low operational cost.

SUMMARY OF THE INVENTION

According to an aspect of the present invention, a mercury reduction system that reduces nitrogen oxide and mercury in flue gas discharged from a boiler includes: an oxidation-reduction agent supplying unit that sprays an oxidation-reduction agent for producing hydrogen chloride and ammonia when evaporated into a flue of the boiler in a liquid state; a reduction denitration apparatus that includes a denitration catalyst for reducing nitrogen oxide in the flue gas with ammonia and for oxidizing mercury in a presence of hydrogen chloride; and a wet desulfurization apparatus that reduces mercury oxidized in the reduction denitration apparatus with an alkali absorbent. The oxidation-reduction agent being sprayed into the flue in the liquid state is evaporated, and decomposed into hydrogen chloride and ammonia.

Advantageously, in the mercury reduction system, the oxidation-reduction agent is ammonium chloride.

Advantageously, in the mercury reduction system, concentration of the oxidation-reduction agent is equal to or less than 43 wt %.

Advantageously, in the mercury reduction system, the oxidation-reduction agent supplying unit includes an oxidation-reduction agent feed pipe through which the oxidation-reduction agent is supplied into the flue in a liquid state, a blow pipe with an injection hole that is inserted into the flue so as to surround the oxidation-reduction agent feed pipe, and through which air supplied therein is injected into the flue, and an injection nozzle that is fitted to an end of the oxidation-reduction agent feed pipe and through which the oxidation-reduction agent is injected, and the oxidation-reduction agent is sprayed into the flue accompanied with the air.

Advantageously, in the mercury reduction system, the spraying unit is a two-fluid nozzle through which the oxidation-reduction agent and the air for spraying the oxidation-reduction agent are injected.

Advantageously, in the mercury reduction system, the oxidation-reduction agent supplying unit includes an oxidation-reduction agent feed pipe through which the oxidation-reduction agent is supplied into the flue in a liquid state, an air feed pipe that is inserted into the flue so as to surround the oxidation-reduction agent feed pipe, and through which air for spraying the oxidation-reduction agent is supplied into the flue, and a two-fluid nozzle that is fitted to an end of the oxidation-reduction agent feed pipe and the air feed pipe, and through which the oxidation-reduction agent and the air are injected, and the oxidation-reduction agent is sprayed into the flue accompanied with the air.

Advantageously, in the mercury reduction system, a diameter of a liquid droplet of the oxidation-reduction agent sprayed from the oxidation-reduction agent supplying unit is equal to or more than 1 nanometer and equal to or less than 100 micrometers on average.

Advantageously, in the mercury reduction system, temperature of the flue gas is equal to or more than 320° C. and equal to or less than 420° C.

Advantageously, the mercury reduction system further includes a nitrogen oxide concentration meter that is provided upstream and downstream of the reduction denitration apparatus, and measures concentration of nitrogen oxide in the flue gas.

Advantageously, the mercury reduction system further includes an ammonia supplying unit that is provided between the oxidation-reduction agent supplying unit and the reduction denitration apparatus, and supplies ammonia into the flue.

Advantageously, the mercury reduction system further includes a hydrogen chloride supplying unit that is provided between the oxidation-reduction agent supplying unit and the reduction denitration apparatus, and supplies hydrogen chloride into the flue.

According to another aspect of the present invention, a mercury reduction method of flue gas containing mercury for reducing nitrogen oxide and mercury in flue gas discharged from a boiler, the mercury reduction method of flue gas containing mercury includes: a step of oxidation-reduction agent supplying for spraying an oxidation-reduction agent for producing hydrogen chloride and ammonia when evaporated into a flue of the boiler; a step of reduction denitration treating for reducing nitrogen oxide in the flue gas with ammonia on a denitration catalyst and oxidizing mercury in a presence of hydrogen chloride; and a step of wet desulfurizing for reducing mercury oxidized at the step of reduction denitration treating with an alkali absorbent. The oxidation-reduction agent being sprayed into the flue in a liquid state is evaporated, and decomposed into hydrogen chloride and ammonia.

Advantageously, in the mercury reduction method of flue gas containing mercury, the oxidation-reduction agent is ammonium chloride.

Advantageously, in the mercury reduction method of flue gas containing mercury, the oxidation-reduction agent is sprayed with a two-fluid nozzle at the step of oxidation-reduction agent supplying.

Advantageously, the mercury reduction method of flue gas containing mercury further includes: a step of nitrogen oxide concentration measuring that is provided prior to and subsequent to the step of reduction denitration treating, and measures concentration of nitrogen oxide in the flue gas; and a step of mercury concentration measuring that is provided subsequent to the step of reduction denitration treating, and measures concentration of mercury in the flue gas. Supply of the oxidation-reduction agent supplied at the step of oxidation-reduction agent supplying is adjusted, based on at least one of the concentration of nitrogen oxide in the flue gas obtained at the step of nitrogen oxide concentration measuring and the concentration of mercury in the flue gas obtained at the step of mercury concentration measuring, or both.

Advantageously, the mercury reduction method of flue gas containing mercury further includes: at least one of a step of ammonia supplying that supplies ammonia into the flue and a step of hydrogen chloride supplying that supplies hydrogen chloride into the flue, or both, between the step of oxidation-reduction agent supplying and the step of reduction denitration treating. Supply of at least one of ammonia and hydrogen chloride or both supplied at least one of at the step of ammonia supplying and at the step of hydrogen chloride supplying or both is adjusted, based on at least one of the concentration of nitrogen oxide in the flue gas obtained at the step of nitrogen oxide concentration measuring and the concentration of mercury in the flue gas obtained at the step of mercury concentration measuring or both.

Advantageously, in the mercury reduction method of flue gas containing mercury, supply of the oxidation-reduction agent is determined by calculating contents of nitrogen oxide and mercury in the flue gas from property of coal used in the boiler.

Advantageously, in the mercury reduction method of flue gas containing mercury, supplies of the oxidation-reduction agent, the ammonia, and the hydrogen chloride are determined by calculating contents of nitrogen oxide and mercury in the flue gas from property of coal used in the boiler.

DETAILED DESCRIPTION OF THE INVENTION

Exemplary embodiments of the present invention will be described in detail below with reference to the accompanying drawings. The present invention is not limited by the embodiments. Constituent elements according to the embodiments below include elements that can be easily conceived by a person skilled in the art, or elements being substantially the same as those elements.

First Embodiment

A mercury reduction system according to a first embodiment of the present invention will be described with reference to the accompanying drawings.

Figure 1:
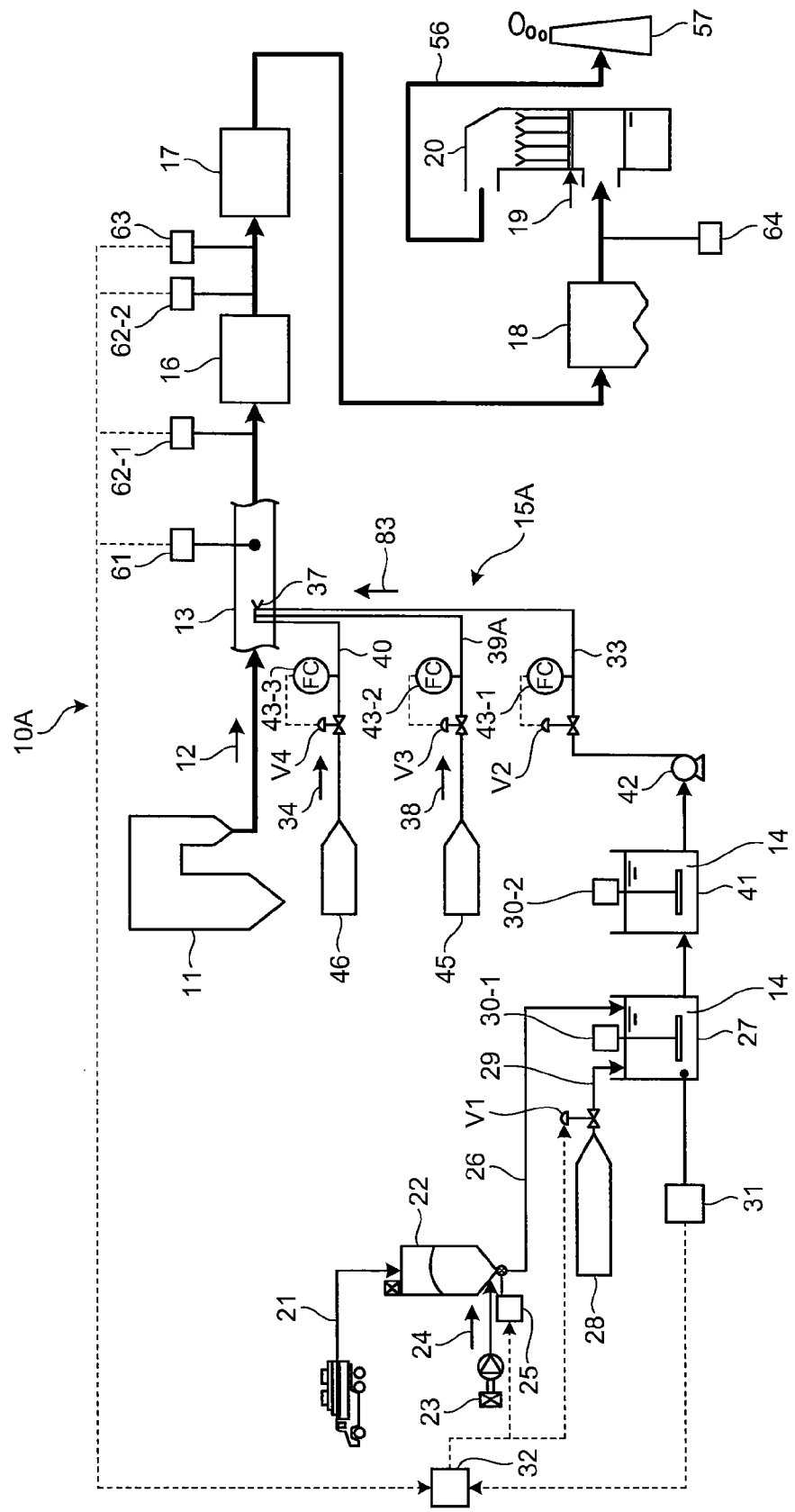
FIG. 1 is a schematic of a mercury reduction system according to a first embodiment of the present invention.

FIG. 1 is a schematic of the mercury reduction system according to the first embodiment of the present invention.

As shown in FIG. 1, a mercury reduction system 10A according to the present embodiment is a mercury reduction system that reduces nitrogen oxide (NOx) and mercury (Hg) in flue gas 12 discharged from a boiler 11. The mercury reduction system 10A includes an ammonium chloride ($NH_4Cl$) supplying unit 15A that sprays an ammonium chloride ($NH_4Cl$) solution 14 containing ammonium chloride ($NH_4Cl$) used as an oxidation-reduction agent into a flue 13 provided downstream of the boiler 11, in a liquid state. The mercury reduction system 10A also includes a reduction denitration apparatus 16 that has a denitration catalyst for reducing NOx in the flue gas 12 with ammonia ($NH_3$) and oxidizing Hg in the presence of hydrogen chloride (HCl), an air heater (APH) 17 that heat exchanges the denitrated flue gas 12, a dust collector 18 that reduces dust in the denitrated flue gas 12, and a wet desulfurization apparatus 20 that reduces Hg oxidized in the reduction denitration apparatus 16 with limestone-gypsum slurry 19 as an alkali absorbent.

In the mercury reduction system 10 according to the present embodiment, $NH_4Cl$ is used as an oxidation-reduction agent. However, the present invention is not limited thereto. Any agent that generates hydrogen chloride (HCl) and ammonia ($NH_3$) when evaporated, may be used as the oxidation-reduction agent.

In the present invention, the oxidation-reduction agent functions as an oxidizing agent for oxidizing and chlorinating mercury (Hg) in the presence of hydrogen chloride (HCl), and a reducing agent for reducing ammonia ($NH_3$).

(Adjusting $NH_4Cl$ Solution)

The $NH_4Cl$ solution 14 is adjusted to a predetermined concentration. Ammonium chloride ($NH_4Cl$) powder 21 is conveyed and supplied to a silo 22 in which the $NH_4Cl$ powder 21 is temporarily retained. A blower 23 supplies air 24 to the $NH_4Cl$ powder 21 in the silo 22 and prevents the $NH_4Cl$ powder 21 from drying and fixing in the silo 22. A predetermined amount of the $NH_4Cl$ powder 21 in the silo 22 is supplied to an $NH_4Cl$ powder feed path 26 from the silo 22 by a feeder 25, and fed into an $NH_4Cl$ dissolving tank 27. A water supplying tank 28 feeds water 29 into the $NH_4Cl$ dissolving tank 27. The $NH_4Cl$ dissolving tank 27 includes a stirring unit 30-1, and the $NH_4Cl$ powder 21 supplied into the $NH_4Cl$ dissolving tank 27 is dissolved in the water 29, thereby generating the $NH_4Cl$ solution 14 of a predetermined concentration. The stirring unit 30-1 keeps the concentration of the $NH_4Cl$ solution 14 constant. The water 29 supplied from the water supplying tank 28 is adjusted by a valve V1.

The concentration of the $NH_4Cl$ solution 14 is preferably more than 0 wt % and equal to or less than 43 wt %, more preferably equal to or more than 10 wt % and equal to or less than 23 wt %, more preferably equal to or more than 18 wt % and equal to or less than 23 wt %, and most preferably about 20 wt %. This is because, the $NH_4Cl$ powder 21 needs to be dissolved in the water 29 at least at room temperature (for example, at around 20° C.), and the concentration of the $NH_4Cl$ solution 14 should be equal to or less than saturation concentration of $NH_4Cl$ in water.

Figure 2:
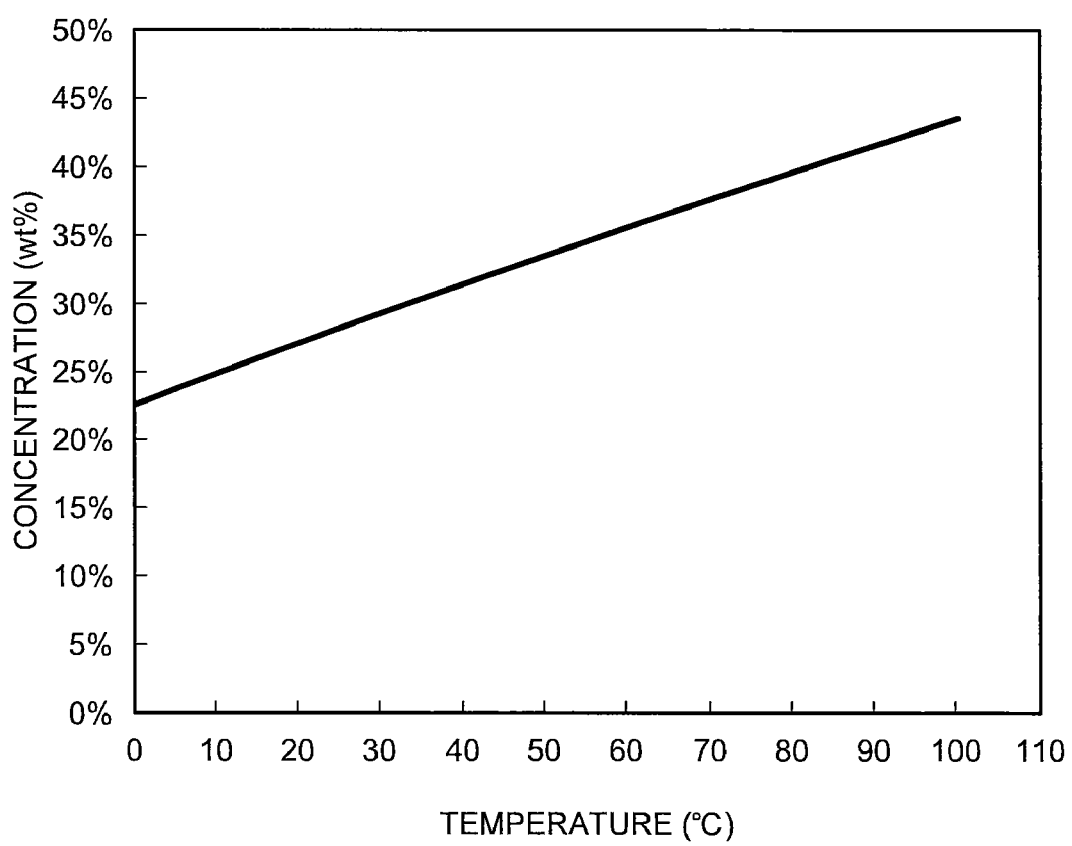
FIG. 2 is a schematic of a relationship between the temperature of $NH_4Cl$ and the saturation temperature in water.

FIG. 2 is a schematic of a relationship between the temperature of $NH_4Cl$ and the saturation temperature in water. As shown in FIG. 2, if the temperature of the solution is about 0° C., the saturation concentration of the $NH_4Cl$ powder 21 that can be dissolved in the water 29 is about 23 wt %, and if the temperature is about 100° C., the saturation concentration of the $NH_4Cl$ powder 21 that can be dissolved in the water 29 is about 43 wt %. Accordingly, the concentration of the $NH_4Cl$ solution 14 needs to be more than 0 wt % and equal to or less than 43 wt %.

(Controlling the Concentration of $NH_4Cl$ Solution)

The $NH_4Cl$ solution 14 in the $NH_4Cl$ dissolving tank 27 is measured by an ammonium chloride ($NH_4Cl$) concentration meter 31 and the measured concentration value of the $NH_4Cl$ solution 14 is transmitted to an arithmetic apparatus 32. The arithmetic apparatus 32 determines the supplies of the $NH_4Cl$ powder 21 and the water 29, based on the concentration of the $NH_4Cl$ solution 14. The arithmetic apparatus 32 transmits control signals to the feeder 25 and the valve V1, and adjusts the supplies of the $NH_4Cl$ powder 21 and the water 29. The concentration of the $NH_4Cl$ solution 14 in the $NH_4Cl$ dissolving tank 27 is adjusted so as to fall within a range more than 0 wt % and equal to or less than 43 wt %.

In the mercury reduction system 10A according to the present embodiment, the $NH_4Cl$ supplying unit 15A includes an $NH_4Cl$ solution feed pipe 33 that supplies the $NH_4Cl$ solution 14 into the flue 13 in a liquid state, a blow pipe 36 (see FIGS. 3 and 4) inserted into the flue 13 so as to surround the $NH_4Cl$ solution feed pipe 33 and that has an injection hole 35

(see FIG. 4) from which air 34 supplied inside is injected into the flue 13, and a two-fluid nozzle 37 attached to an end of the $NH_4Cl$ solution feed pipe 33 and that injects the $NH_4Cl$ solution 14. The $NH_4Cl$ supplying unit 15A also includes an air feed pipe 39A connected to the two-fluid nozzle 37 and that supplies air 38 used for compressing and spraying the $NH_4Cl$ solution 14, and an air feed pipe 40 connected to the blow pipe 36 (see FIG. 3) and that supplies the air 34 used for compressing and spraying the $NH_4Cl$ solution 14 into the blow pipe 36. In FIG. 1, the air feed pipe 40 is inserted into the flue 13. However, the air feed pipe 40 is actually connected to the blow pipe 36 (see FIG. 3).

Figure 3:
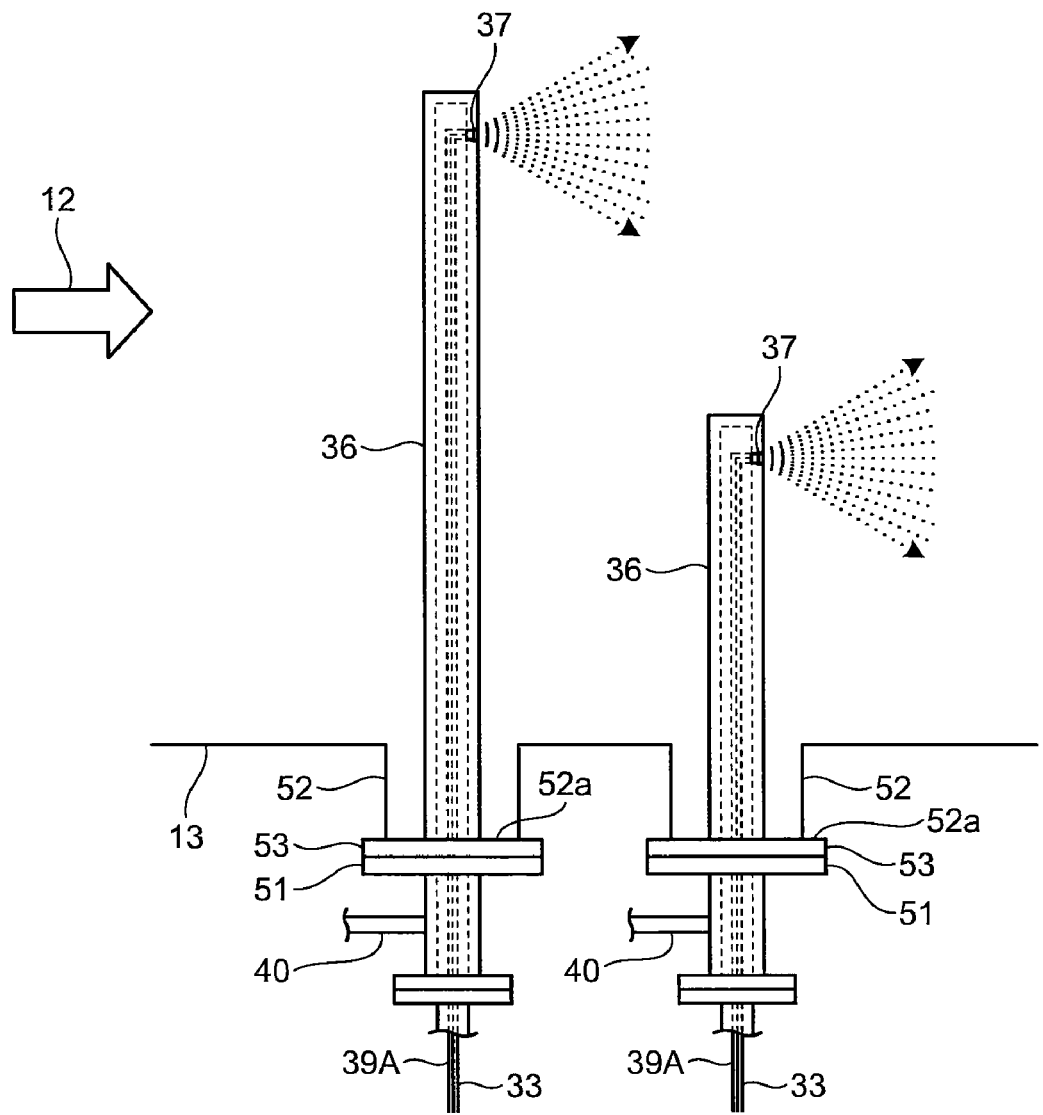
FIG. 3 is a schematic of flues in which an $NH_4Cl$ solution feed pipe and an air feed pipe are inserted, and near the flues.
Figure 4:
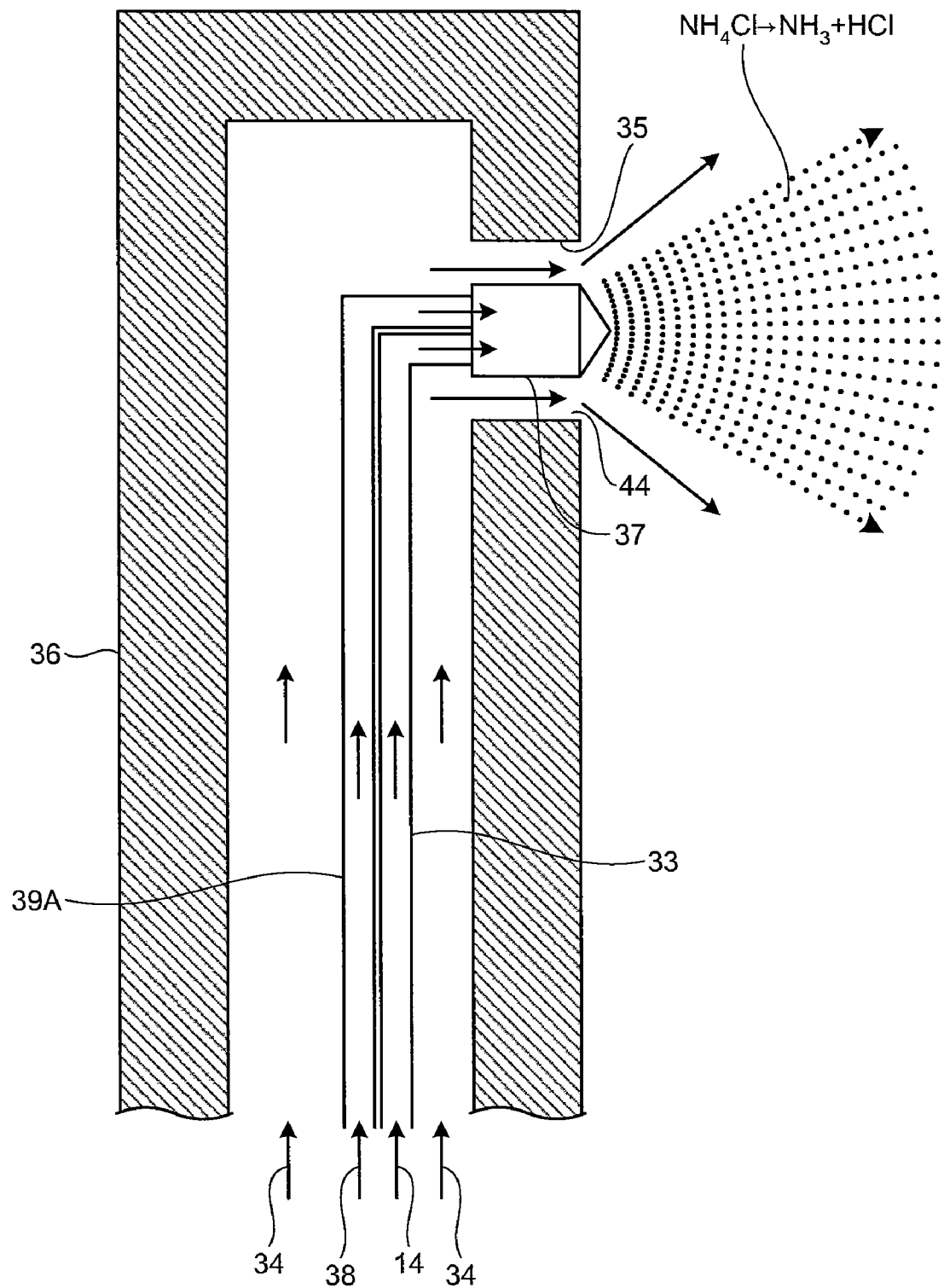
FIG. 4 is a partially enlarged sectional view of FIG. 3.

FIG. 3 is a schematic of flues in which an $NH_4Cl$ solution feed pipe and an air feed pipe are inserted, and near the flues. FIG. 4 is a partially enlarged sectional view of FIG. 3. As shown in FIG. 3, the blow pipe 36 is inserted into the flue 13 so as to surround the $NH_4Cl$ solution feed pipe 33 and the air feed pipe 39A. As shown in FIG. 4, the $NH_4Cl$ solution feed pipe 33 is provided so as to be adjacent to the air feed pipe 39A in the blow pipe 36. The two-fluid nozzle 37 is provided in the injection hole 35 at the wall surface of the blow pipe 36, and connected to the $NH_4Cl$ solution feed pipe 33 and the air feed pipe 39A. The $NH_4Cl$ solution 14 injected from the two-fluid nozzle 37 is sprayed by the air 38, and the $NH_4Cl$ solution 14 is further sprayed into the flue 13, accompanied with the air 34 injected from the injection hole 35.

The $NH_4Cl$ solution 14 in the $NH_4Cl$ dissolving tank 27 is fed into a dissolved $NH_4Cl$ feed tank 41, and the dissolved $NH_4Cl$ feed tank 41 temporarily retains the $NH_4Cl$ solution in the $NH_4Cl$ dissolving tank 27. The $NH_4Cl$ dissolving tank 27 includes a stirring unit 30-2 that keeps the $NH_4Cl$ concentration of the $NH_4Cl$ solution in the $NH_4Cl$ dissolving tank 27 constant. The $NH_4Cl$ solution 14 in the dissolved $NH_4Cl$ feed tank 41 is then fed to the two-fluid nozzle 37, through the $NH_4Cl$ solution feed pipe 33 by a feed pump 42. The flow rate of the $NH_4Cl$ solution 14 in the $NH_4Cl$ solution feed pipe 33 is measured by a flowmeter 43-1, and the supply of the $NH_4Cl$ solution 14 is adjusted by a valve V2. The dissolved $NH_4Cl$ feed tank 41 is not essential and may not be used.

An air supplying unit 46 feeds the air 38 to the two-fluid nozzle 37 through the air feed pipe 39A, and the air 38 is used as compressing air for spraying the $NH_4Cl$ solution 14 from the two-fluid nozzle 37. Accordingly, the $NH_4Cl$ solution 14 sprayed from the two-fluid nozzle 37 can be sprayed in fine liquid droplets: As shown in FIG. 1, the flow rate of the air 38 supplied from the air feed pipe 39A is measured by a flowmeter 43-2, and adjusted by a valve V3. The size of the liquid droplets of the $NH_4Cl$ solution 14 sprayed from the two-fluid nozzle 37 can be adjusted, by the flow rate of the air 38 supplied from the air feed pipe 39A.

The flow rate of the air 38 injected from the two-fluid nozzle 37 preferably has an air-water ratio of equal to or more than 100 and equal to or less than 10000 (volume ratio), for example. This is to spray the $NH_4Cl$ solution 14 injected from the two-fluid nozzle 37 into the flue 13, in fine liquid droplets.

The air supplying unit 46 feeds the air 34 into the blow pipe 36 through the air feed pipe 40, and the air 34 is used as compressing air for dispersing the liquid droplets of the $NH_4Cl$ solution 14 sprayed from the two-fluid nozzle 37. As shown in FIG. 1, the flow rate of the air 34 supplied from the air supplying unit 46 is measured by a flowmeter 43-3, and adjusted by a valve V4. As shown in FIG. 4, the air 34 is injected from a space 44 between the injection hole 35 of the blow pipe 36 and the two-fluid nozzle 37. Because the air 34 is injected from the space 44, the liquid droplets of the $NH_4Cl$ solution 14 sprayed from the two-fluid nozzle 37 can be dispersed into the flue 13 further more.

The air 34 injected from the injection hole 35 is used to prevent the $NH_4Cl$ solution 14 injected from the two-fluid nozzle 37 from being fixed to the blow pipe 36, and to prevent the temperature in the blow pipe 36 from increasing. The air 34 is also used to prevent the $NH_4Cl$ solution 14 from boiling and ammonium chloride particles from depositing.

The air 34 flows between the blow pipe 36 and the $NH_4Cl$ solution feed pipe 33. Accordingly, the air 34 acts as air for cooling the $NH_4Cl$ solution 14, and prevents the heat of the flue gas 12 in the flue 13 from being transmitted to the $NH_4Cl$ solution feed pipe 33 from the outside of the blow pipe 36. The temperature in the blow pipe 36 is prevented from increasing and the $NH_4Cl$ solution 14 is prevented from being heated. Consequently, the $NH_4Cl$ solution 14 is prevented from boiling in the blow pipe 36, and maintained in a liquid state up to when the $NH_4Cl$ solution 14 is injected. It is also possible to prevent the two-fluid nozzle 37 from corroding.

Because the temperature in the blow pipe 36 can be prevented from increasing, a metal material can be used for the $NH_4Cl$ solution feed pipe 33 and the air feed pipe 39A. The material for the $NH_4Cl$ solution feed pipe 33 and the air feed pipe 39A may be, for example, as follows: The $NH_4Cl$ solution feed pipe 33 may be a corrosion resistant metal such as a nickel based heat resistant and corrosion resistant alloy like Hastelloy C, and a resin-lined steel pipe (low temperature portion). The air feed pipe 39A may be carbon steel, stainless-steel, and the like. The material for the $NH_4Cl$ solution feed pipe 33 and the air feed pipe 39A is not particularly limited to the metal material.

Because the $NH_4Cl$ solution 14 can be supplied into the flue 13 from the dissolved $NH_4Cl$ feed tank 41 in a room temperature, an inexpensive resin or a resin-lined pipe can be used as a material for the $NH_4Cl$ solution feed pipe 33 and the blow pipe 36.

In the mercury reduction system 10A according to the present embodiment, for example, a few to, at most, a few tens of two-fluid nozzles 37 are provided in the flue 13. Conventionally, a few hundreds to a few thousands of $NH_3$ grids are provided in the flue 13, for example. By contrast, only a few to, at most, a few tens of two-fluid nozzles 37 are provided in the flue 13, and the two-fluid nozzles 37 are fixed by flange portions 51 and 53. Accordingly, the nozzles can be replaced easily. In FIG. 3, two two-fluid nozzles 37 are provided. However, the present invention is not limited thereto, and a plurality of two-fluid nozzles 37 may be provided as appropriate based on the installation area in the flue 13.

As shown in FIG. 3, the blow pipe 36 includes the flange portion 51 at the outside of the flue 13 and the outer periphery of the blow pipe 36. The flange portion 51 is formed so as to correspond to the flange portion 53 provided at an end 52a of an opening 52 of the flue 13. Because the flange portion 51 of the blow pipe 36 is connected to the flange portion 53 provided at the flue 13, the blow pipe 36 is fixed to the flue 13. The flange portion 51 of the blow pipe 36 and the flange portion 53 of the flue 13 may be fixed by bolts, for example, by providing a plurality of holes at the outer peripheries of the flange portion 51 and the flange portion 53. The blow pipe 36 can be easily inserted and removed into and from the flue 13, by removably connecting the flange portion 51 and the flange portion 53. Accordingly, it is possible to easily maintain the insides of the blow pipe 36 and the flue 13.

The two-fluid nozzles 37 are used for spraying the $NH_4Cl$ solution 14. However, the present invention is not limited thereto, and an ordinary injection nozzle for spraying liquid may also be used.

Figure 5:
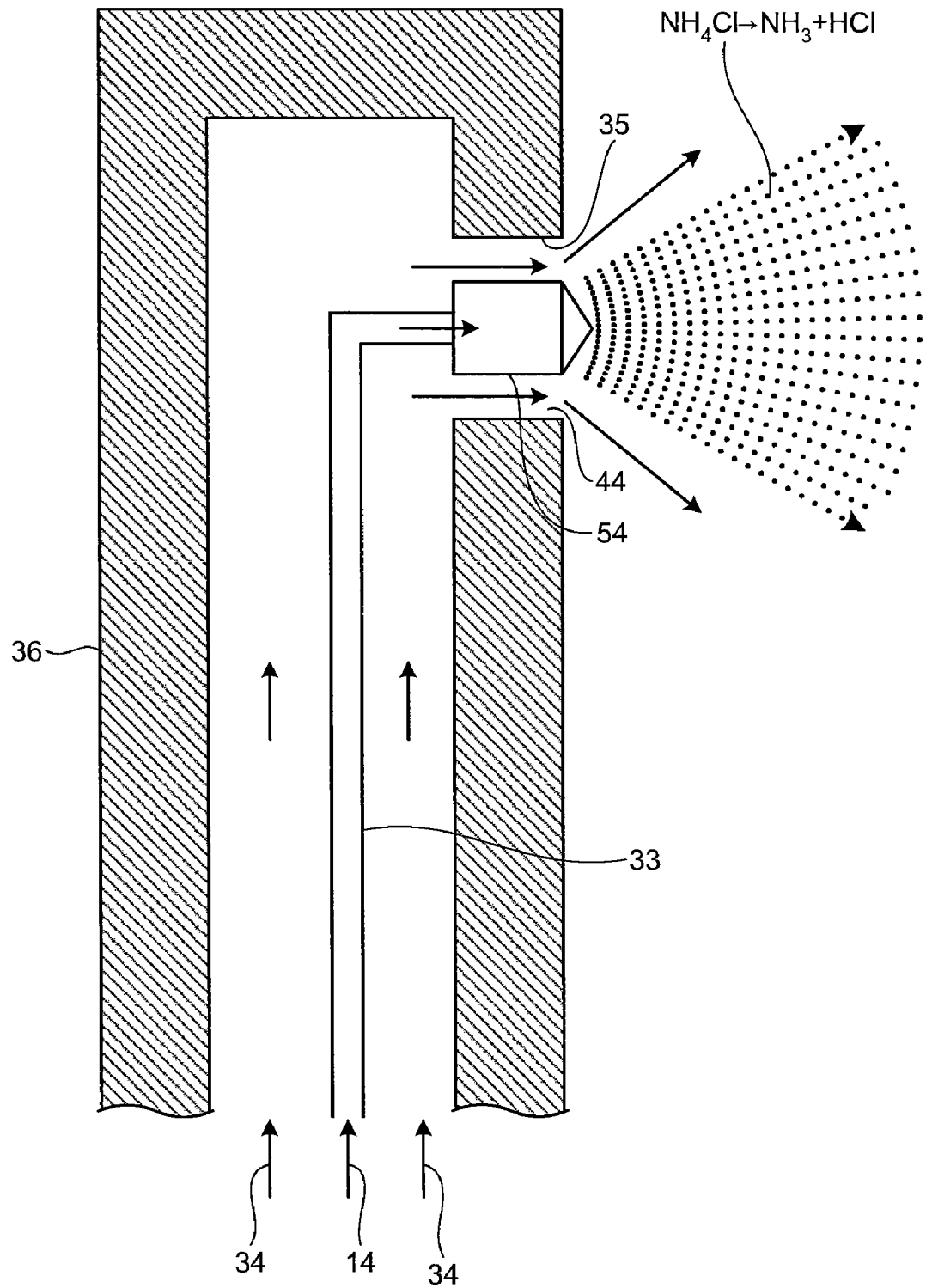
FIG. 5 is a partially enlarged sectional view of a blow pipe with an ordinary injection nozzle.

FIG. 5 is a partially enlarged sectional view of a blow pipe with an ordinary injection nozzle. As shown in FIG. 5, if the size of liquid droplets of the NH₄Cl solution 14 need not particularly be adjusted, the NH₄Cl solution 14 may be injected from an injection nozzle 54 and sprayed into the flue 13, accompanied with air 45 injected from an injection hole 47.

The blow pipe 36 includes the NH₄Cl solution feed pipe 33 and the air feed pipe 39A therein, and the NH₄Cl solution 14 is sprayed into the flue 13 from the two-fluid nozzles 37. However, the present invention is not limited thereto. If the NH₄Cl solution 14 in the NH₄Cl solution feed pipe 33 is prevented from being heated, the NH₄Cl solution 14 may be sprayed into the flue 13, by connecting the NH₄Cl solution feed pipe 33 and the air feed pipe 39A with the two-fluid nozzles 37, without using the blow pipe 36.

Figure 6:
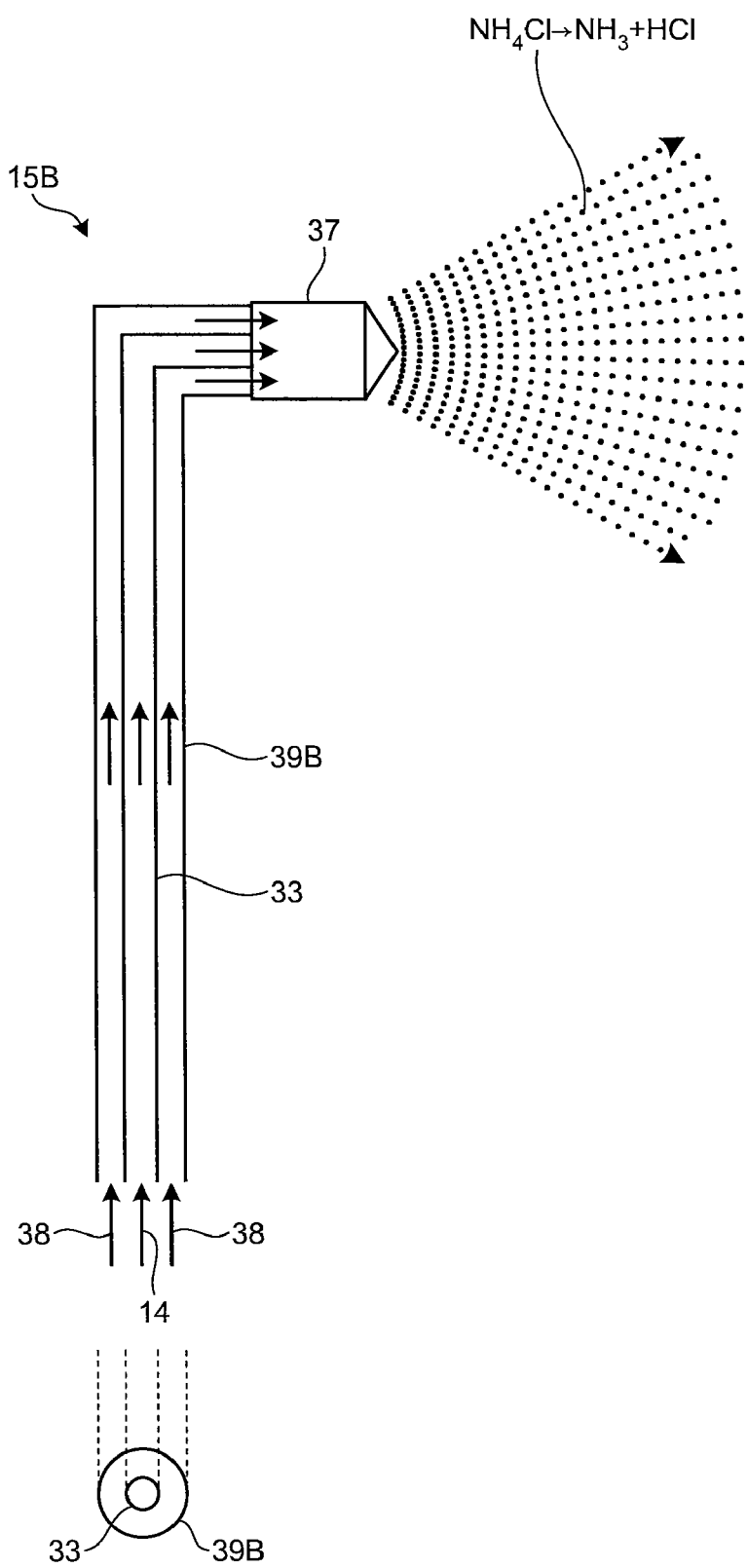
FIG. 6 is a schematic of another spraying method of $NH_4Cl$ solution with a two-fluid nozzle.

FIG. 6 is a schematic of another spraying method of NH₄Cl solution with a two-fluid nozzle. As shown in FIG. 6, an NH₄Cl supplying unit 15B has a double pipe structure, and uses the NH₄Cl solution feed pipe 33 as an inner pipe, and an air feed pipe 39B as an outer pipe. The NH₄Cl solution feed pipe 33 and the air feed pipe 39B are connected to the two-fluid nozzles 37.

In other words, as shown in FIG. 6, the NH₄Cl supplying unit 15B includes the NH₄Cl solution feed pipe 33 that supplies the NH₄Cl solution 14 into the flue 13, an air feed pipe 55 inserted into the flue 13 so as to surround the NH₄Cl solution feed pipe 33 and that supplies the air 38 for spraying the NH₄Cl solution 14 into the flue 13, and the two-fluid nozzles 37 fixed to the ends of the NH₄Cl solution feed pipe 33 and the air feed pipe 39B, and that injects the NH₄Cl solution 14 and the air 38. Because the air feed pipe 39B surrounds the NH₄Cl solution feed pipe 33, the NH₄Cl solution 14 in the NH₄Cl solution feed pipe 33 is prevented from being heated by the flue gas 12 in the flue 13, due to the air 38 supplied into the air feed pipe 39B. It is also possible to spray the NH₄Cl solution 14 into the flue 13 accompanied with the air 38. Because the NH₄Cl supplying unit 15B does not include the blow pipe 36 as shown in FIGS. 3 to 5, the installation of the NH₄Cl solution feed pipe 33, the air feed pipe 39B, and the two-fluid nozzles 37 in the flue 13 can be simplified. Because the blow pipe 36 is not included, the NH₄Cl solution feed pipe 33, the air feed pipe 39B, and the two-fluid nozzles 37 can be easily replaced.

The air 38 is supplied from an air supplying unit 45 and the air 34 is supplied from the air supplying unit 46. In other words, air is separately supplied from different supplying sources. However, the present invention is not limited thereto, and the air may be supplied from the same supplying source. In other words, the air 34 may be supplied from the air supplying unit 45, and the air 38 may be supplied from the air supplying unit 46.

The temperature of the flue gas 12 in the flue 13, for example, is equal to or more than 320° C. and equal to or less than 420° C., and is very hot. The NH₄Cl solution feed pipe 33 is provided in the blow pipe 36, and the air 34 is used to cool the NH₄Cl solution 14. Accordingly, the NH₄Cl solution 14 is maintained in a liquid state up to when the NH₄Cl solution 14 is injected from the two-fluid nozzles 37. Because the NH₄Cl solution 14 is sprayed from the two-fluid nozzles 37 in liquid droplets, the liquid droplets of the sprayed NH₄Cl solution 14 are evaporated, due to the high ambient temperature of the flue gas 12.

In other words, the sprayed liquid droplets of the NH₄Cl solution 14 temporarily generate fine NH₄Cl solid particles, because the liquid droplets are evaporated by the high ambient temperature of the flue gas 12, and as represented by the following formula (1), decomposed into HCl and NH₃, and sublimated. Accordingly, it is possible to generate HCl and NH₃ from the liquid droplets of the NH₄Cl solution 14 sprayed from the two-fluid nozzles 37, and supply the HCl and NH₃ into the flue 13.

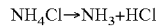

$$NH_4Cl \rightarrow NH_3 + HCl \quad (1)$$

The temperature of the flue gas 12 in the flue 13, although depending on the combustion condition of the boiler 11, for example, is preferably equal to or more than 320° C. and equal to or less than 420° C., more preferably equal to or more than 320° C. and equal to or less than 380° C., and more preferably equal to or more than 350° C. and equal to or less than 380° C. This is because the reduction reaction of NOx and the oxidation reaction of Hg can be simultaneously carried out on a denitration catalyst.

NH₃ concentration and HCl concentration in the flue gas 12 in the flue 13 are set, relative to NOx concentration in the flue gas 12, so that the ratio of the molar number of NH₃ to the molar number of NOx in the flue gas 12 (NH₃(NOx molar ratio) is a value equal to or less than one, based on the required denitration performance.

Although depending on the NOx concentration in the flue gas 12, the NH₄Cl solution 14 may be sprayed, so that the NH₃ concentration and the HCl concentration fall within a range from a few tens to a few hundreds parts per million, or preferably from a few tens to 200 parts per million. This is because NH₃ and NOx react at a molar ratio of 1:1, and if NH₃ is over-supplied, an excess of NH₃ is remained after the reaction. Acid sulfate is produced from NH₃ and the components in the flue gas 12. By spraying the NH₄Cl solution 14 as the above, it is possible to prevent the inside of the flue 13, the air heater 17, the dust collector 18, and the like from being corroded and damaged, and from being blocked due to ash deposition. It is also possible to prevent the flue gas 12 from leaking from the damaged flue 13.

The Hg concentration in the flue gas 12 is preferably set in a range equal to or more than 0.1 μg/m³N and equal to or less than a few ten μg/m³N, and relative to the HCl concentration in the flue gas 12, it is preferable to set in a range equal to or less than 1/1000 in molar ratio.

The hole diameter of each two-fluid nozzle 37 is preferably equal to or more than 0.01 millimeter and equal to or less than 10 millimeters, and more preferably equal to or more than 0.1 millimeter and equal to or less than 5 millimeters.

The size of the liquid droplets of the NH₄Cl solution 14 spayed from the two-fluid nozzle 37 is preferably fine liquid droplets of equal to or more than 1 nanometer and equal to or less than 100 micrometers in average. By generating the fine liquid droplets of equal to or more than 1 nanometer and equal to or less than 100 micrometers in average, the solid particles of NH₄Cl generated from the liquid droplets of the sprayed NH₄Cl solution 14 can be decomposed into NH₃ and HCl in the flue gas 12 in a short retention time, and sublimated. Because the NH₄Cl solution 14 does not need to be heated in advance, it is possible to prevent the flue 13 and the two-fluid nozzle 37 from being degraded and corroded.

Figure 12:
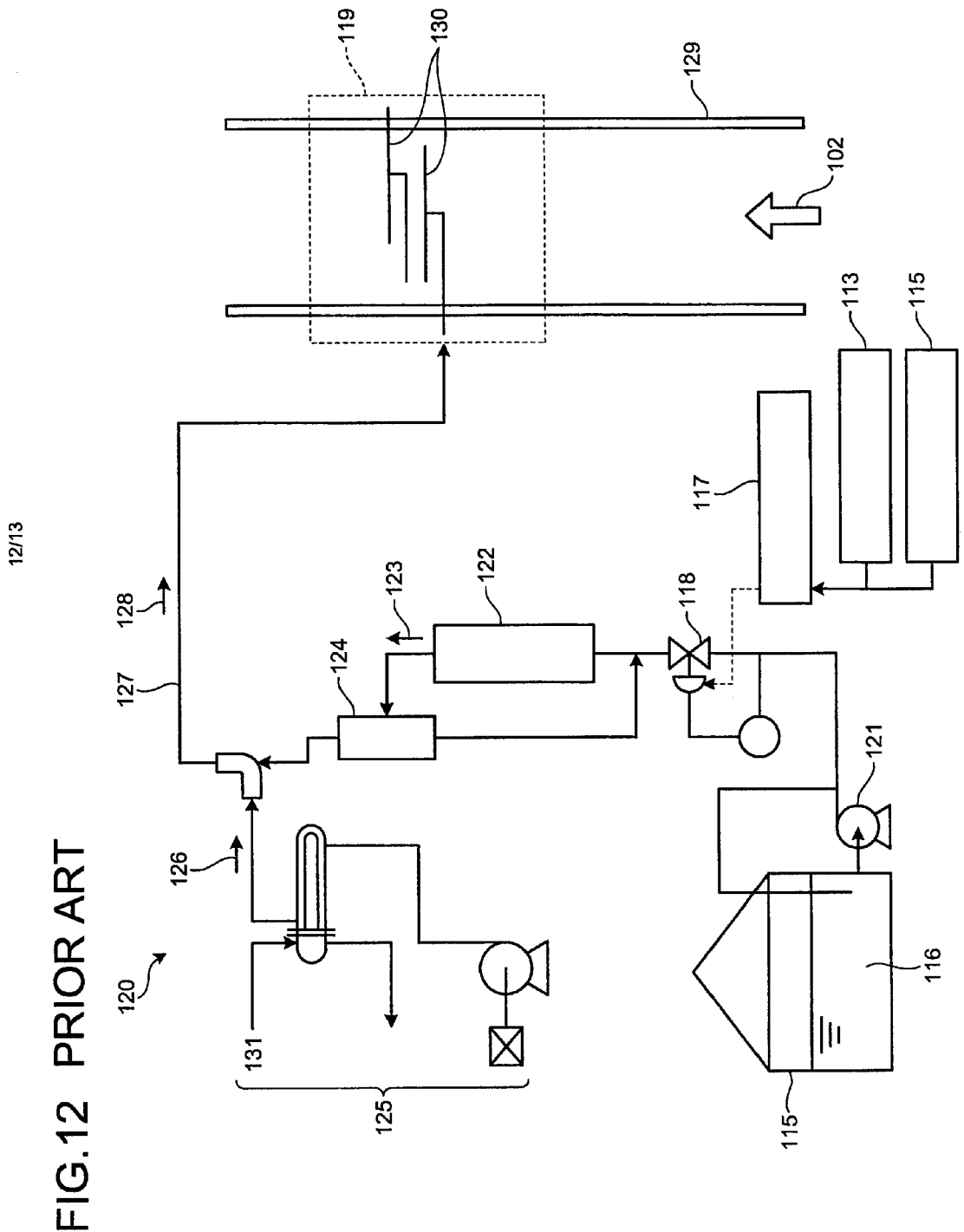
FIG. 12 is a schematic of the mercury chlorinating agent feed apparatus of a mercury reduction system.

Accordingly, in the mercury reduction system 10A according to the present embodiment, the NH₄Cl solution 14 is sprayed from the two-fluid nozzle 37 in a liquid state. Consequently, the NH₄Cl solution 14 is decomposed into HCl and NH₃, due to the high ambient temperature of the flue gas 12, and supplied into the flue 13. As a result, the hydrogen chloride vaporizer 122, a spray grid, the hydrochloric acid solution tank 116, and the like in the mercury chlorinating agent feed apparatus of the conventional mercury reduction system, as shown in FIG. 12, can be omitted.

The NH₄Cl powder 21 used for adjusting the NH₄Cl solution 14 is neutral salt. Accordingly, the NH₄Cl powder 21 is easy to handle, and inexpensive and easy to obtain as can be used as fertilizer. Because $NH_3$ can be generated from the $NH_4Cl$ solution 14, the usage of $NH_3$ can be reduced. Because HCl is a dangerous substance, handling costs, such as a cost for transportation, a cost for legislative permission, and a cost for safety control are expensive. However, the $NH_4Cl$ powder 21 can significantly reduce the handling cost.

The $NH_4Cl$ solution 14 is dissolved in water and fully evaporated into $NH_3$ and HCl. Because $NH_4Cl$ solid particles do not remain, it is possible to prevent the $NH_4Cl$ solid particles from accumulating in the flue 13 and on the denitration catalyst provided downstream. It is also possible to prevent the denitration catalyst from deteriorating.

The $NH_4Cl$ solution 14 is evaporated into $NH_3$ and HCl, by using the flue gas 12 as a heat source. Accordingly, the installation of sublimation equipment such as a new heat source like steam, for evaporating the $NH_4Cl$ solution 14, can be omitted. It is also possible to reduce the retention time required for evaporating the $NH_4Cl$ solution 14 in the flue gas 12.

The flow rate of the $NH_4Cl$ solution 14 sprayed from the two-fluid nozzle 37 is only a small amount of a few t/h, compared with the amount of flue gas, for example, of 1,500,000 $m^3N/h$. Accordingly, the temperature of the flue gas 12 can be prevented from lowering, for example, to equal to or less than a few degrees. Consequently, it is possible to prevent $SO_3$ in the flue gas 12 from condensing, and also prevent ash in the flue gas 12 from accumulating and fixing in the flue 13 and the like.

Figure 13:
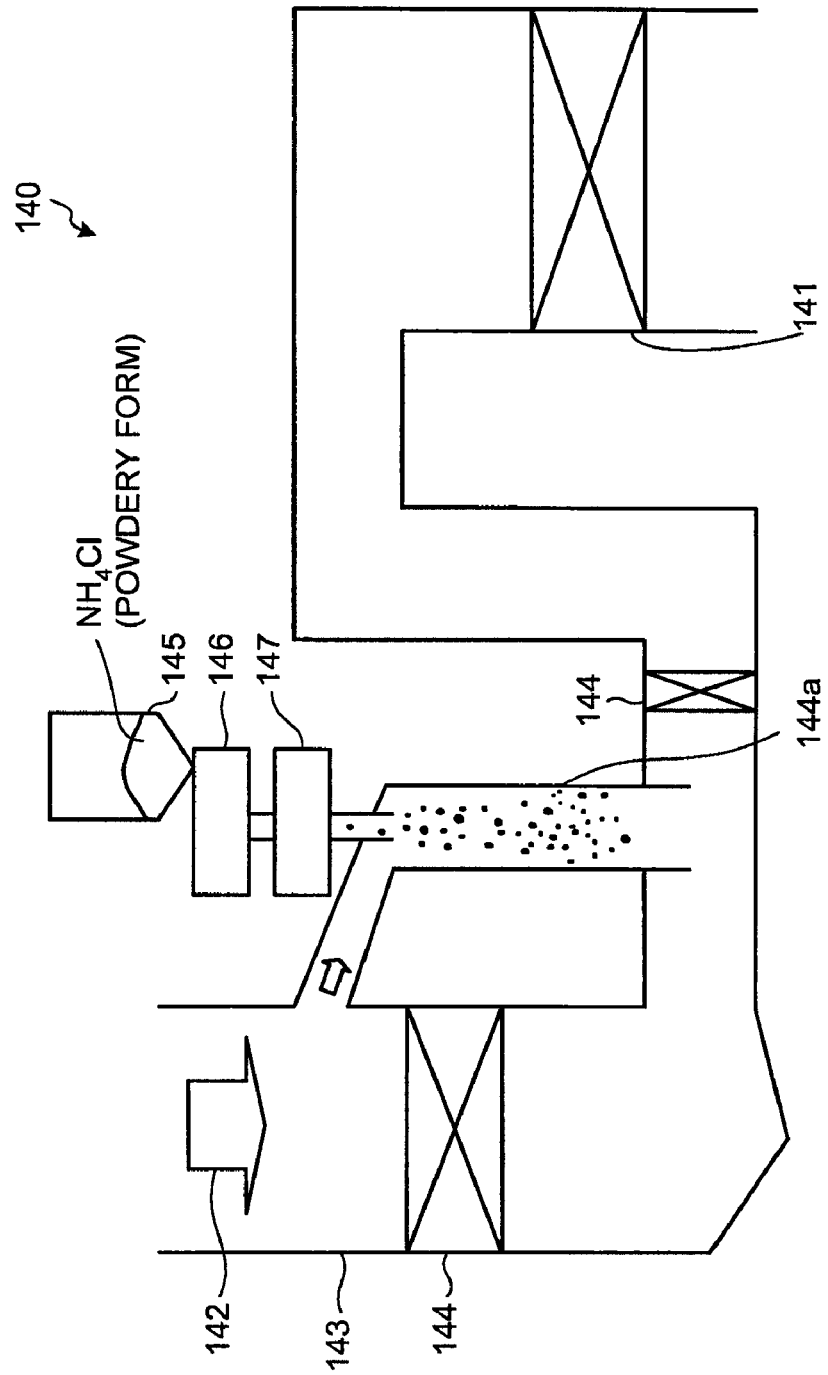
FIG. 13 is a schematic of an air pollution control apparatus using an $NH_4Cl$ solid.

Compared with the conventional flue gas control apparatus shown in FIG. 13, in which $NH_4Cl$ solid is crushed and sprayed, the mercury reduction system 10A according to the present embodiment sprays the $NH_4Cl$ solution 14, which is liquid. Accordingly, the size of the liquid particles of the $NH_4Cl$ solution 14 can easily be reduced, and solid particles having the size equal to or less than the sprayed fine liquid droplets can be generated. Consequently, it is possible to significantly reduce the time required to decompose the $NH_4Cl$ solution 14.

Because the $NH_4Cl$ powder 21 is used for the $NH_4Cl$ solution 14, $NH_4Cl$ need not be finely crushed as the conventional method, but may be stored in the pellet state and used accordingly.

It is less expensive to supply a single piece of $NH_4Cl$ than to purchase $NH_3$ and HCl separately, as in a conventional manner. Accordingly, operational costs of the device can be reduced, thereby easily collecting the facility costs required for installation.

The supplies of the $NH_4Cl$ powder 21 and the water 29 can be adjusted, based on the concentration of the $NH_4Cl$ solution 14. Accordingly, the concentration of the $NH_4Cl$ solution 14 can be adjusted, based on the concentrations of NOx and Hg in the flue gas 12.

HCl and $NH_3$ generated from the liquid droplets of the $NH_4Cl$ solution 14, as shown in FIG. 1, are fed to the reduction denitration apparatus 16 accompanied with the flue gas 12. $NH_3$ generated by decomposing $NH_4Cl$ is used to reduce NOx in the reduction denitration apparatus 16, and HCl is used to oxidize Hg. Accordingly, NOx and Hg are reduced from the flue gas 12.

In other words, the reduction denitration apparatus 16 is filled with denitration catalyst. On the denitration catalyst, $NH_3$ is used to reduce NOx as represented by the following formula (2), and HCl is used to oxidize Hg as represented by the following formula (3).

   (2)

   (3)

As shown in FIG. 1, the flue gas 12 is fed into the wet desulfurization apparatus 20 through the air heater 17 and the dust collector 18, after NOx and Hg in the flue gas 12 are reduced and oxidized in the reduction denitration apparatus 16. A heat collector may be provided between the air heater 17 and the dust collector 18. HgCl in the flue gas 12 is absorbed by limestone-gypsum slurry 19 used as an alkali absorbent in the wet desulfurization apparatus 20, separated from the flue gas 12, and reduced. Accordingly, the flue gas 12 is purified. The purified flue gas is discharged from a stack 57 as purified gas 56. The limestone-gypsum slurry 19 is used as the alkali absorbent. However, any solution that can absorb HgCl in the flue gas 12 can be used as the alkali absorbent.

A mixer that mixes $NH_3$ and HCl may be provided downstream of the two-fluid nozzle 37 and upstream of the reduction denitration apparatus 16. The mixer, for example, may be a static mixer. If $NH_3$ and HCl generated by evaporating the $NH_4Cl$ solution 14 sprayed from the two-fluid nozzle 37 are not dispersed enough, the mixer provided upstream of the reduction denitration apparatus 16 can uniformly disperse $NH_3$ and HCl in the flue gas 12.

A flowmeter 61 that measures the flow rate of the $NH_4Cl$ solution 14 sprayed from the two-fluid nozzle 37 may be provided downstream of the two-fluid nozzle 37. Accordingly, the flow rate of the $NH_4Cl$ solution 14 sprayed from the two-fluid nozzle 37 can be measured. The flow velocity of the flue gas 12 in the flue 13 can also be measured.

NOx concentration meters 62-1 and 62-2 are provided inlet side and the outlet side of the reduction denitration apparatus 16. The reduction rate of NOx in the reduction denitration apparatus 16 can be identified, from the NOx concentration values in the flue gas 12 measured by the NOx concentration meters 62-1 and 62-2. Accordingly, by controlling the $NH_4Cl$ concentration and the supply flow rate of the $NH_4Cl$ solution 14, from the values of NOx concentration in the flue gas 12 measured by the NOx concentration meters 62-1 and 62-2, the $NH_4Cl$ concentration in the $NH_4Cl$ solution 14 sprayed from the two-fluid nozzle 37 can be set, so as to satisfy a predetermined denitration performance.

The mercury reduction system 10A according to the present embodiment also includes a mercury (Hg) concentration meter 63 that measures Hg contained in the treatment gas discharged from the reduction denitration apparatus 16, and a hydrogen chloride (HCl) concentration meter 64 that measures HCl contained in the flue gas 12 supplied to the wet desulfurization apparatus 20. The Hg concentration meter 63 may be provided downstream of the wet desulfurization apparatus 20, and measure mercury (Hg) contained in the treatment gas discharged from the wet desulfurization apparatus 20.

The oxidation rate of Hg in the reduction denitration apparatus 16 can be identified, from values of the HCl concentration and the Hg concentration in the flue gas 12, measured by the Hg concentration meter 63 and the HCl concentration meter 64. By controlling the $NH_4Cl$ concentration and the supply flow rate of the $NH_4Cl$ solution 14, from the Hg concentration value in the flue gas 12 measured by the Hg concentration meter 63 and the HCl concentration meter 64, the $NH_4Cl$ concentration and the supply flow rate of the $NH_4Cl$ solution 14 sprayed from the two-fluid nozzle 37 can be set so as to satisfy the predetermined denitration performance and to maintain the oxidation performance of Hg.

The additional amount of the $NH_4Cl$ solution 14 is controlled, so that the mercury oxidation rate ($Hg^{2+}/Hg^T$) is equal to or more than 90%, or the oxidized mercury concentration ($Hg^{2+}$) is equal to or less than 1 μg/$Nm^3$, at the outlet of the reduction denitration apparatus 16. $Hg^T$ is the total mercury concentration, and expressed by a sum of the metallic mercury concentration ($Hg^0$) and the oxidized mercury concentration ($Hg2^+$), as the following formula (4).

$$Hg^T = Hg^0 + Hg^{2+} \qquad (4)$$

The supply of the $NH_4Cl$ solution 14 may be determined, by calculating the contents of NOx and Hg in the flue gas 12, from the property of coal used in the boiler 11. In other words, the contents of NOx and Hg in the flue gas 12 can be obtained by burning the property of coal in the boiler 11. If the coal is burnt in the boiler 11 to the maximum extent, the maximum amounts of NOx and Hy in the flue gas 12 can be obtained from the combustion amount of the boiler 11. Consequently, the supply of the $NH_4Cl$ solution 14 can be determined, by obtaining the contents of NOx and Hg in the flue gas 12 from the property of the coal used in the boiler 11.

As described below, if equipment for supplying $NH_3$ and HCl is provided in the flue 13, the contents of NOx, Hg, and HCl in the flue gas 12 can be obtained from the property of coal used in the boiler 11, thereby determining the supplies of the $NH_4Cl$ solution 14, $NH_3$, and HCl, respectively.

<Configuration of Mercury Reduction System in Which Equipment for Supplying $NH_3$ and HCl are Provided>

Figure 7:
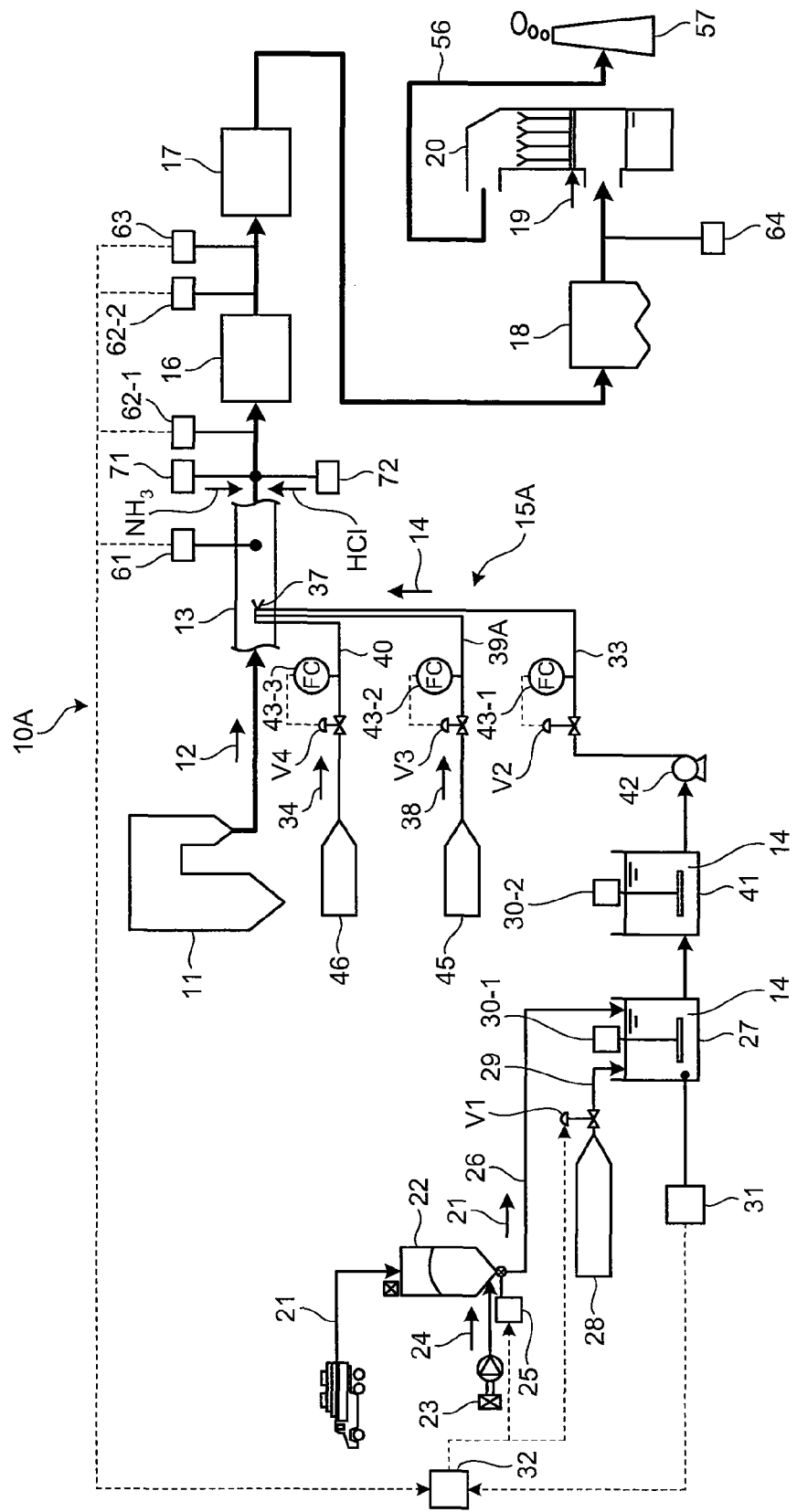
FIG. 7 is a schematic of another configuration of the mercury reduction system according to the first embodiment.

FIG. 7 is a schematic of another configuration of the mercury reduction system according to the present embodiment.

As shown in FIG. 7, the mercury reduction system 10A according to the present embodiment may include an $NH_3$ supplying unit 71 that supplies $NH_3$ into the flue 13 and an HCl supplying unit 72 that supplies HCl into the flue 13, between the $NH_4Cl$ supplying unit 15A and the reduction denitration apparatus 16. If the balance of the concentrations of NOx and Hg in the flue gas 12 discharged from the combustion equipment such as the boiler 11 is different from ordinary one, the required amount of HCl or $NH_3$ may be adjusted and supplied into the flue 13.

When the $NH_3$ supplying unit 71 that sprays $NH_3$ into the flue 13 is included, the supply of $NH_3$ supplied from the $NH_3$ supplying unit 71 is also controlled, based on the values of the nitrogen oxide (NOx) concentration meters 62-1 and 62-2.

If the $NH_3$ supplying unit 71, for example, is already installed in the flue 13 and the like, or if the amount of HCl is required less than $NH_3$, the $NH_4Cl$ solution 14 is supplied up to the required amount of HCl, and $NH_3$ is added if the amount of $NH_3$ is equal to or more than the required mount of HCl.

The $NH_3$ concentration and the HCl concentration in the flue 13 are controlled, so that the combination of $NH_3$ dissociated from the $NH_4Cl$ solution 14 and $NH_3$ to be added is, similar to the above, a value in which the molar ratio of $NH_3/NOx$ is a value equal to or less than one, based on the required denitration performance.

The oxidation ratio of Hg in the reduction denitration apparatus 16 is identified, by measuring the Hg concentration and the HCl concentration in the flue gas 12, by the Hg concentration meter 63 and the HCl concentration meter 64 provided downstream of the reduction denitration apparatus 16. The supply of HCl supplied from the HCl supplying unit 72 is also controlled, with the values obtained by the Hg concentration meter 63 and the HCl concentration meter 64.

The additional amount of HCl is set, so that the combination of HCl dissociated from the $NH_4Cl$ solution 14 and HCl added by the HCl supplying unit 72 has, similar to the above, the mercury oxidation rate ($Hg^{2+}/Hg^T$) of equal to or more than 90%, or the oxidized mercury concentration ($Hg^{2+}$) of equal to or less than 1 μg/$Nm^3$, at the outlet of the reduction denitration apparatus 16.

<When Concentrations of NOx and Hg are Different>

If the balance of the concentrations of NOx and Hg in the flue gas 12 discharged from combustion equipment such as the boiler 11 is different from ordinary one, the required amount of HCl or $NH_3$ may be supplied into the flue 13, so as to correspond thereto.

In other words, if the HCl concentration required for oxidizing Hg, and the $NH_3$ concentration required for reducing NOx are different, at least one of the required HCl and $NH_3$ may be supplied.

For example, if the amount of HCl required for oxidizing Hg is larger than that of $NH_3$ required for reducing NOx, it means that the amount of HCl is in short supply. In this case, as shown in FIG. 7, the HCl supplying unit 72 supplies HCl into the flue 13, and the two-fluid nozzle 37 sprays the $NH_4Cl$ solution 14.

If the amount of HCl required for oxidizing Hg is less than that of $NH_3$ required for reducing NOx, it means that the amount of $NH_3$ is in short supply. In such an event, as shown in FIG. 7, the $NH_3$ supplying unit 71 supplies $NH_3$ into the flue 13, and the two-fluid nozzle 37 sprays the $NH_4Cl$ solution 14. Instead of supplying $NH_3$, it is also possible to spray urea (($H_2N)_2C=O$).

The order of the position from which the HCl supplying unit 72 supplies HCl, the position from which the $NH_3$ supplying unit 71 supplies $NH_3$, and the position from which the two-fluid nozzle 37 sprays the $NH_4Cl$ solution 14 may be arbitrary. However, it is preferable that the position from which the $NH_4Cl$ solution 14 is sprayed, is provided closer to the upstream than the positions from which $NH_3$ and HCl are supplied. This is because the $NH_4Cl$ solution 14 takes more time to evaporate and vaporize, than $NH_3$ and HCl.

Accordingly, for example, to supply HCl and the $NH_4Cl$ solution 14 into the flue 13, it is preferable to spray HCl from the HCl supplying unit 71, after the two-fluid nozzle 37 sprays the $NH_4Cl$ solution 14 from the upstream side.

To supply $NH_3$ and the $NH_4Cl$ solution 14 into the flue 13, it is preferable to spray $NH_3$ or urea from the $NH_3$ supplying unit 71, after the two-fluid nozzle 37 sprays the $NH_4Cl$ solution 14 from the upstream side.

To supply HCl and $NH_3$ into the flue 13, it is preferable to spray $NH_3$ or urea from the $NH_3$ supplying unit 71, after the HCl supplying unit 72 supplies HCl from the upstream side.

Accordingly, in the mercury reduction system 10A according to the present embodiment, as shown in FIG. 7, $NH_3$ and HCl are supplied separately. Accordingly, even if the concentration of NOx or Hg in the flue gas 12 varies, an appropriate response can be taken.

In the mercury reduction system 10A according to the present embodiment, $NH_4Cl$ is used as an oxidation reduction agent. However, an ammonium halide such as ammonium bromide ($NH_4Br$) and ammonium iodide ($NH_4I$) other than $NH_4Cl$ may be used as the oxidation-reduction agent, and use the aqueous solution.

Figure 8:
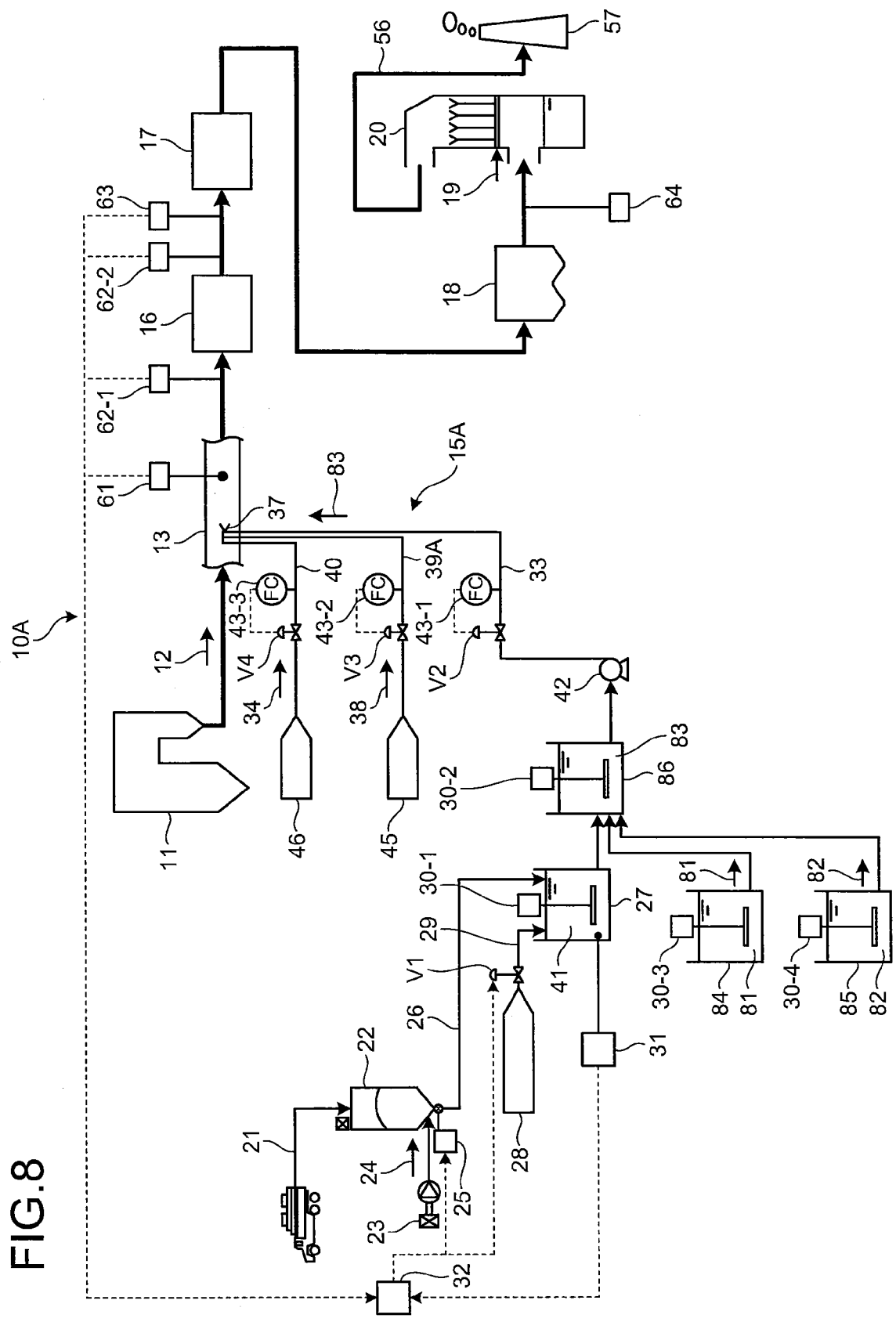
FIG. 8 is a schematic of another configuration of the mercury reduction system according to the first embodiment.

In the mercury reduction system 10A according to the present embodiment, the $NH_4Cl$ solution 14 may be used, by mixing at least one of a solution containing a reducing agent and a solution containing a mercury chlorinating agent or both. FIG. 8 is a schematic of a configuration using a mixed solution obtained by mixing an ammonia ($NH_3$) solution generated by dissolving ammonia ($NH_3$) used as a reducing agent, and a hydrogen chloride (HCl) solution generated by dissolving hydrogen chloride (HCl) used as a mercury chlorinating agent.

As shown in FIG. 8, the mercury reduction system 10A according to the present embodiment sprays a mixed solution 83 obtained by mixing the $NH_4Cl$ solution 14, $NH_3$ solution 81, and HCl solution 82 into the flue 13 from the two-fluid nozzle 37. The $NH_4Cl$ solution 14 in the $NH_4Cl$ dissolving tank 27, the $NH_3$ solution 81 in an ammonia ($NH_3$) dissolving tank 84, and the HCl solution 82 in a hydrogen chloride (HCl) dissolving tank 85 are supplied to a mixed solution tank 86, and mixed in the mixed solution tank 86. The obtained mixed solution 83 is fed to the two-fluid nozzle 37 and sprayed into the flue 13 from the two-fluid nozzle 37. Because $NH_3$ and HCl can be supplied separately, an appropriate response can be made depending on the concentration of NOx or Hg in the flue gas 12. The $NH_3$ dissolving tank 84 and the HCl dissolving tank 85 include stirring units 30-3 and 30-4, thereby keeping the $NH_3$ concentration of the $NH_3$ solution 81 in the $NH_3$ dissolving tank 84 constant, and keeping the HCl concentration of the HCl solution 82 in the HCl dissolving tank 85 constant.

$NH_3$ is used as a reducing agent. However, urea (($H_2N)_2C=O$) and the like with reducing action may be used as the reducing agent, and use the aqueous solution. To adjust the $NH_4Cl$ solution 14, urea (($H_2N)_2C=O$) may be dissolved into the water 39 as well as the $NH_4Cl$ powder 31, and the aqueous solution in which the $NH_4Cl$ powder 31 and the urea are mixed may be used. In a boiler facility, the NOx concentration varies. In such an event, the supply of $NH_3$ may be increased, by adding urea as well as $NH_4Cl$.

HCl is used as a mercury chlorinating agent. However, a hydrogen halide such as hydrogen bromide (Hbr) and hydrogen iodide (HI) other than HCl may be used as the mercury chlorinating agent, and use the aqueous solution.

In this manner, in the mercury reduction system 10A according to the present embodiment, the non-gaseous $NH_4Cl$ solution 14 is sprayed to the upstream of the reduction denitration apparatus 16 in the flue 13 in a liquid state, at ordinary pressure and room temperature, and the sprayed $NH_4Cl$ solution 14 is evaporated and decomposed into HCl and $NH_3$. Accordingly, on the denitration catalyst, Hg and NOx in the flue gas 12 can be oxidized and reduced, respectively. Consequently, the reduction performance of Hg in the flue gas 12 can be maintained. The installation of equipment such as an HCl vaporizer, a spray grid, and a storage tank, can be omitted. Because the $NH_4Cl$ powder 21 is easy to handle, it is possible to significantly reduce the cost for legislative permission and the installation cost required for safety control. The chemical cost of the $NH_4Cl$ powder 21 is also inexpensive, and the flue gas 12 is used as a heat source to sublimate $NH_4Cl$ generated from the liquid droplets of the $NH_4Cl$ solution 14 being sprayed. As a result, new sublimation equipment is not required, thereby reducing operational cost.

Second Embodiment

Figure 9:
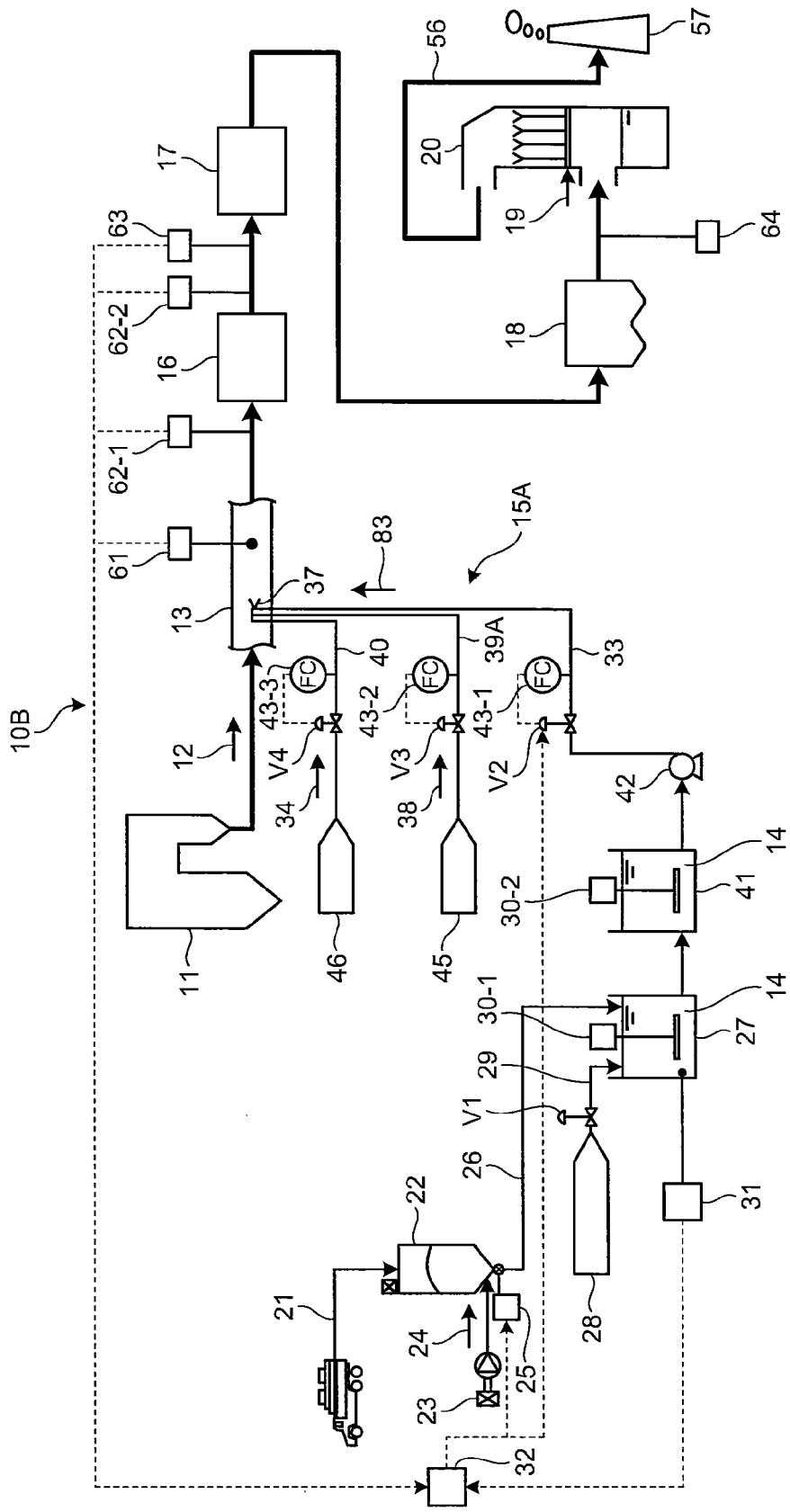
FIG. 9 is a schematic of a mercury reduction system according to a second embodiment of the present invention.

A mercury reduction system according to a second embodiment of the present invention will be described with reference to the accompanying drawings. FIG. 9 is a schematic of the mercury reduction system according to the second embodiment of the present invention. The same members as those of the mercury reduction system according to the first embodiment are denoted by the same reference numerals, and the detailed descriptions thereof will be omitted.

As shown in FIG. 9, a mercury reduction system 10B according to the present embodiment adjusts the flow rate of the $NH_4Cl$ solution 14 that flows though the $NH_4Cl$ solution feed pipe 33 from the dissolved $NH_4Cl$ feed tank 41 by the feed pump 42, based on the concentration of $NH_4Cl$ of the $NH_4Cl$ solution 14 by the valve V2.

The arithmetic apparatus 32 calculates the supply speed of the $NH_4Cl$ solution 14, based on the concentration value of the $NH_4Cl$ solution 14 measured by the $NH_4Cl$ concentration meter 31. The supply speed of the $NH_4Cl$ solution 14 calculated by the arithmetic apparatus 32 is transmitted to the valve V2. Accordingly, the flow rate of the $NH_4Cl$ solution 14 that flows through the $NH_4Cl$ solution feed pipe 33 can be adjusted, by adjusting the opening and closing of the valve V2. For example, on referring to the flow rate of the $NH_4Cl$ solution 14 when the concentration of the $NH_4Cl$ solution 14 is about 20 wt %, if the concentration of the $NH_4Cl$ solution 14 is higher than 20 wt %, the flow rate of the $NH_4Cl$ solution 14 is lowered, and if the concentration of the $NH_4Cl$ solution 14 is lower than 20 wt %, the flow rate of the $NH_4Cl$ solution 14 is increased.

Accordingly, the $NH_4Cl$ solution 14 can be supplied into the flue 13 from the two-fluid nozzle 37 at an appropriate flow rate, based on the concentration of the $NH_4Cl$ solution 14 in the $NH_4Cl$ dissolving tank 27. In this manner, it is possible to reliably evaporate $NH_4Cl$, thereby more reliably preventing the powder and the like resulting from $NH_4Cl$ from remaining.

Third Embodiment

A mercury reduction system according to a third embodiment of the present invention will be described with reference to the accompanying drawings.

Figure 10:
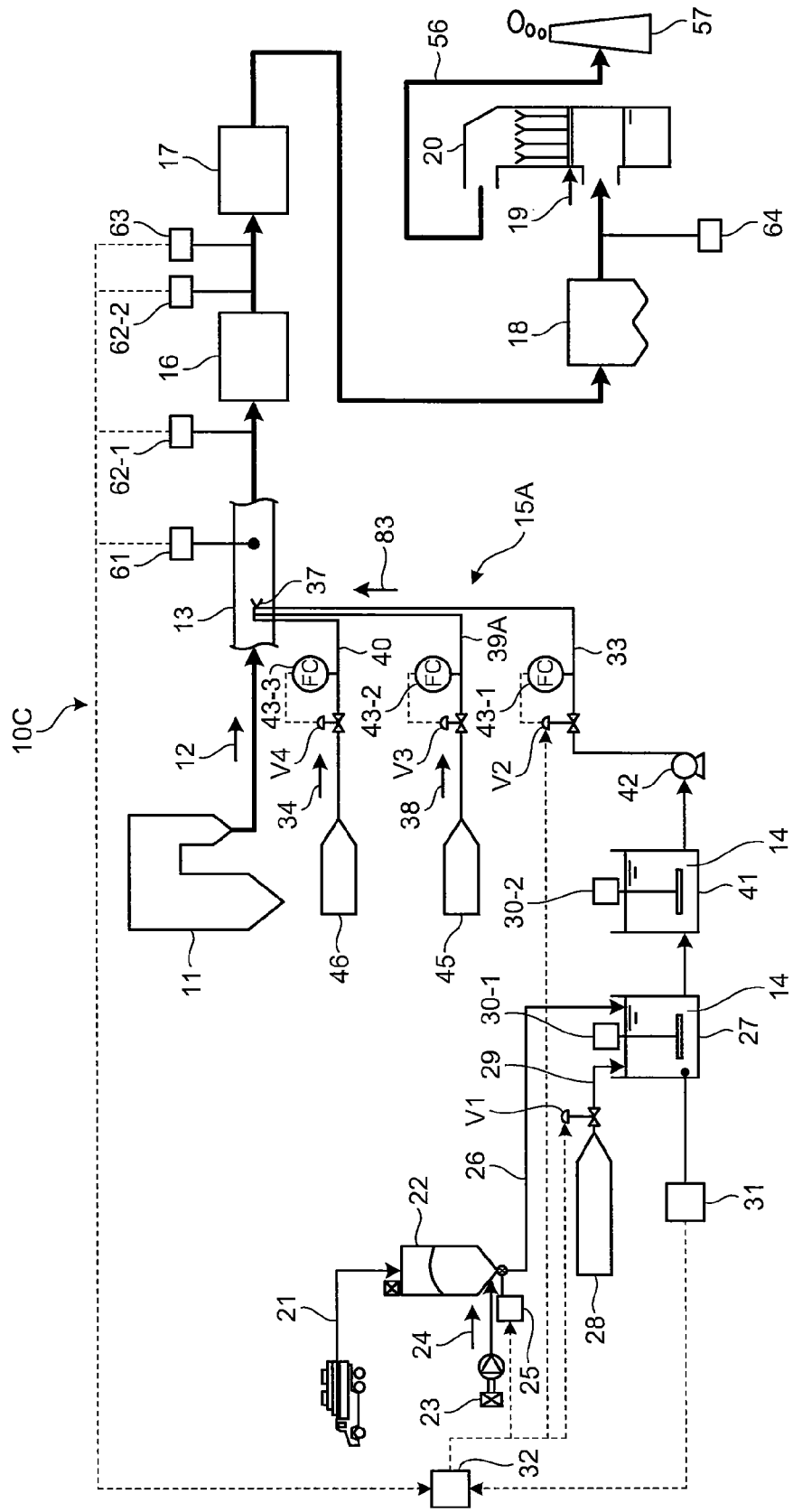
FIG. 10 is a schematic of a mercury reduction system according to a third embodiment of the present invention.
Figure 11:
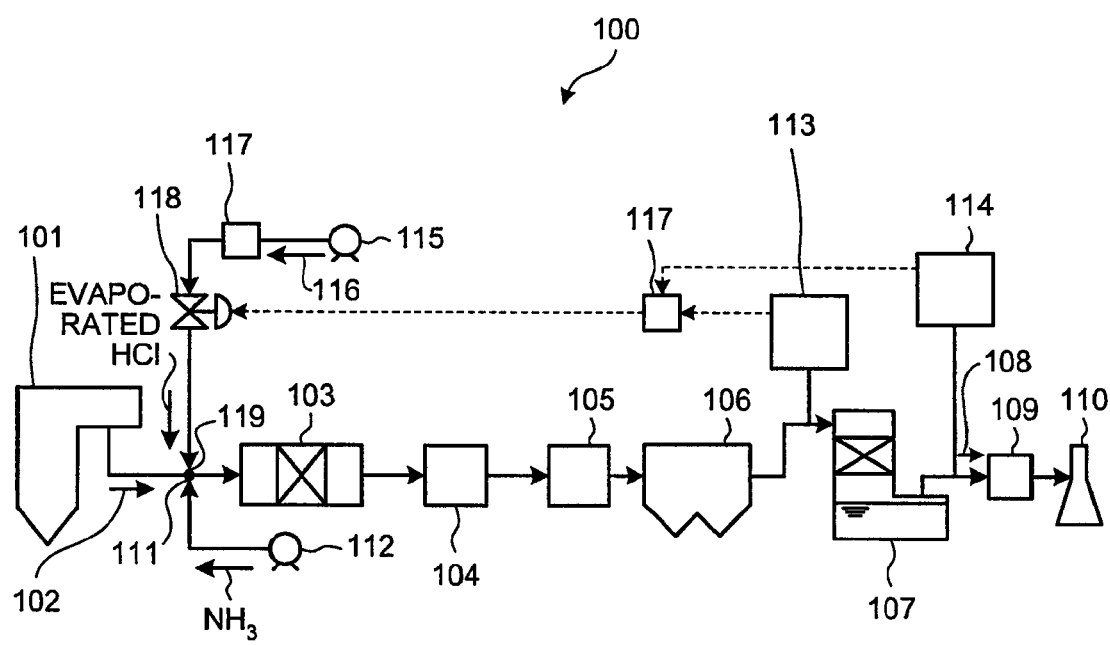
FIG. 11 is a schematic of a mercury chlorinating agent feed apparatus including an HCl vaporizer.

FIG. 10 is a schematic of the mercury reduction system according to the third embodiment of the present invention. The same members as those of the mercury reduction system according to the first and the second embodiments are denoted by the same reference numerals, and the detailed descriptions thereof will be omitted.

As shown in FIG. 10, a mercury reduction system 10C according to the present embodiment adjusts the supply of the $NH_4Cl$ powder 21 in the silo 22 fed to the $NH_4Cl$ dissolving tank 27, based on the concentration of $NH_4Cl$ of the $NH_4Cl$ solution 14, the supply of water 29 fed to the $NH_4Cl$ dissolving tank 27 from the water supplying tank 28, and the flow rate of the $NH_4Cl$ solution 14 that flows through the $NH_4Cl$ solution feed pipe 33 from the dissolved $NH_4Cl$ feed tank 41 by the feed pump 42.

The concentration of the $NH_4Cl$ solution 14 can be arbitrarily adjusted, because the arithmetic apparatus 32 adjusts the supply of the $NH_4Cl$ powder 21 fed into the $NH_4Cl$ dissolving tank 27 by the feeder 25, and the supply of the water 29 fed into the $NH_4Cl$ dissolving tank 27 by a valve V1, based on the NOx concentration and the Hg concentration in the flue gas 12, corresponding to the concentration value of the $NH_4Cl$ solution 14 measured by the $NH_4Cl$ concentration meter 31. The flow rate of the $NH_4Cl$ solution 14 that flows through the $NH_4Cl$ solution feed pipe 33 can be adjusted with a valve V2, by the feed rate of the $NH_4Cl$ solution 14, corresponding to the adjusted concentration of the $NH_4Cl$ solution 14.

The concentration of the $NH_4Cl$ solution 14 can be arbitrary adjusted, based on the NOx concentration and the Hg concentration in the flue gas 12. Accordingly, it is possible to supply the $NH_4Cl$ solution 14 in an appropriate flow rate into the flue 13 from the two-fluid nozzle 37, based on the adjusted concentration of the $NH_4Cl$ solution 14. Consequently, the required amount of $NH_4Cl$ can be supplied into the flue gas 12, corresponding to the concentrations of NOx and Hg in the flue gas discharged from combustion equipment such as a boiler. In this manner, it is possible to reliably evaporate NH$_4$Cl, thereby more reliably preventing the powder and the like resulting from NH$_4$Cl from remaining.

In this manner, the mercury reduction system according to the present invention sprays NH$_4$Cl into the flue in a liquid state, evaporates NH$_4$Cl generated from the fine liquid droplets of the sprayed NH$_4$Cl by the flue gas that passes through the flue, and decomposes into HCl and NH$_3$. Accordingly, it is possible to prevent operational costs from increasing, while maintaining the reduction performance of Hg.

With the present invention, an oxidation-reduction agent is sprayed to the upstream of a reduction denitration apparatus in a flue in a liquid state, and the sprayed non-gaseous oxidation-reduction agent is evaporated and decomposed into hydrogen chloride and ammonia. Accordingly, mercury and NOx in flue gas can be oxidized and reduced, respectively. As a result, it is possible to keep operational cost low, while maintaining the mercury reduction performance in a wet desulfurization apparatus.

What is claimed is:

1. A mercury reduction system that reduces nitrogen oxide and mercury in flue gas discharged from a boiler, the mercury reduction system comprising:
    an oxidation-reduction agent supplying unit that sprays an oxidation-reduction agent for producing hydrogen chloride and ammonia when evaporated into a flue of the boiler in a liquid state, wherein the oxidation-reduction agent being sprayed into the flue in the liquid state evaporates and decomposes into hydrogen chloride and ammonia;
    a reduction denitration apparatus that includes a denitration catalyst for reducing nitrogen oxide in the flue gas with ammonia and for oxidizing mercury in a presence of hydrogen chloride;
    a wet desulfurization apparatus that reduces mercury oxidized in the reduction denitration apparatus with an alkali absorbent,
    an ammonia supplying unit that is provided between the oxidation-reduction agent supplying unit and the reduction denitration apparatus and supplies ammonia into the flue, and
    a hydrogen chloride supplying unit that is provided between the oxidation-reduction agent supplying unit and the reduction denitration apparatus and supplies hydrogen chloride into the flue, wherein
    the hydrogen chloride supplying unit or the ammonia supplying unit supplies at least one of the required HCl and NH$_3$, if HCl concentration required for oxidizing Hg and NH$_3$ concentration required for reducing NO$_x$ are different.

2. The mercury reduction system according to claim 1, wherein the oxidation-reduction agent is ammonium chloride.

3. The mercury reduction system according to claim 1, wherein concentration of the oxidation-reduction agent is equal to or less than 43 wt %.

4. The mercury reduction system according to claim 1, wherein
    the oxidation-reduction agent supplying unit includes
    an oxidation-reduction agent feed pipe through which the oxidation-reduction agent is supplied into the flue in a liquid state,
    a blow pipe with an injection hole that is inserted into the flue so as to surround the oxidation-reduction agent feed pipe, and through which air supplied therein is injected into the flue, and
    an injection nozzle that is fitted to an end of the oxidation-reduction agent feed pipe and through which the oxidation-reduction agent is injected, and
    the oxidation-reduction agent is sprayed into the flue accompanied with the air.

5. The mercury reduction system according to claim 1, wherein
    the oxidation-reduction agent supplying unit includes
    an oxidation-reduction agent feed pipe through which the oxidation-reduction agent is supplied into the flue in a liquid state,
    an air feed pipe that is inserted into the flue so as to surround the oxidation-reduction agent feed pipe, and through which air for spraying the oxidation-reduction agent is supplied into the flue, and
    a two-fluid nozzle that is fitted to an end of the oxidation-reduction agent feed pipe and the air feed pipe, and through which the oxidation-reduction agent and the air are injected, and
    the oxidation-reduction agent is sprayed into the flue accompanied with the air.

6. The mercury reduction system according to claim 1, wherein a diameter of a liquid droplet of the oxidation-reduction agent sprayed from the oxidation-reduction agent supplying unit is equal to or more than 1 nanometer and equal to or less than 100 micrometers on average.

7. The mercury reduction system according to claim 1, wherein temperature of the flue gas is equal to or more than 320° C. and equal to or less than 420° C.

8. The mercury reduction system according to claim 1, further comprising a nitrogen oxide concentration meter that is provided upstream and downstream of the reduction denitration apparatus, and measures concentration of nitrogen oxide in the flue gas.

* * * * *